(12) United States Patent
Umeda et al.

(10) Patent No.: US 10,423,347 B2
(45) Date of Patent: Sep. 24, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kiyoshi Umeda, Kawasaki (JP); Tomohiro Suzuki, Kawasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 15/722,250

(22) Filed: Oct. 2, 2017

(65) Prior Publication Data

US 2018/0107418 A1 Apr. 19, 2018

(30) Foreign Application Priority Data

Oct. 18, 2016 (JP) ................................ 2016-204253

(51) Int. Cl.
*G06F 3/06* (2006.01)
*H04N 1/00* (2006.01)

(52) U.S. Cl.
CPC ............ *G06F 3/0631* (2013.01); *G06F 3/067* (2013.01); *G06F 3/0619* (2013.01); *G06F 3/0647* (2013.01); *H04N 1/001* (2013.01)

(58) Field of Classification Search
CPC .... G06F 3/0604; G06F 3/0619; G06F 3/0631; G06F 3/0643; G06F 3/0647; G06F 3/067; G06F 3/0671; G06F 3/0673; G06F 3/0683; H04N 1/001
USPC ................................................ 711/170, 171
See application file for complete search history.

(56) References Cited

U.S. PATENT DOCUMENTS

| 9,436,413 B2 | 9/2016 | Mizoguchi et al. |
| 9,465,571 B2 | 10/2016 | Kato et al. |
| 9,471,284 B2 | 10/2016 | Kurokawa et al. |
| 9,582,232 B2 | 2/2017 | Umeda et al. |
| 9,671,981 B2 | 6/2017 | Kunieda et al. |
| 9,671,984 B2 | 6/2017 | Sumi et al. |
| 9,678,700 B2 | 6/2017 | Goto et al. |
| 9,769,335 B2 | 9/2017 | Umeda et al. |
| 9,817,614 B2 | 11/2017 | Suzuki et al. |
| 10,101,910 B1 * | 10/2018 | Karppanen ........... G06F 3/0604 |

(Continued)

FOREIGN PATENT DOCUMENTS

JP 2008108006 A 5/2008

OTHER PUBLICATIONS

Copending, unpublished U.S. Appl. No. 15/726,932 to Tomohiro Suzuki et al., filed Oct. 6, 2017.

(Continued)

*Primary Examiner* — Gary J Portka
(74) *Attorney, Agent, or Firm* — Venable LLP

(57) ABSTRACT

The present invention allows reducing the possibility that an application operating in an information processing apparatus is erased from a memory upon its transfer to background. In a case where a predetermined application is executed in foreground, an OS is caused to execute predetermined processing by using a first size memory area, and in a case where the predetermined application is executed in the background, the OS is caused to execute the predetermined processing by using a second size memory area that is smaller than the first size memory area.

21 Claims, 15 Drawing Sheets

(56) References Cited

U.S. PATENT DOCUMENTS

| | | | |
|---|---|---|---|
| 2005/0228964 A1* | 10/2005 | Sechrest | G06F 12/121 |
| | | | 711/170 |
| 2010/0315676 A1* | 12/2010 | Nago | H04M 1/7253 |
| | | | 358/1.15 |
| 2012/0173788 A1* | 7/2012 | Godwin | G06F 9/45533 |
| | | | 710/313 |
| 2014/0289426 A1* | 9/2014 | Chan | G06F 9/54 |
| | | | 709/247 |
| 2015/0379741 A1 | 12/2015 | Obayashi et al. | |
| 2017/0228199 A1 | 8/2017 | Kunieda et al. | |
| 2017/0235526 A1 | 8/2017 | Goto et al. | |
| 2017/0235533 A1 | 8/2017 | Sumi et al. | |
| 2017/0286022 A1 | 10/2017 | Omagari et al. | |

OTHER PUBLICATIONS

Copending, unpublished U.S. Appl. No. 15/632,547 to Tomohiro Suzuki et al., filed Jun. 26, 2017.

\* cited by examiner

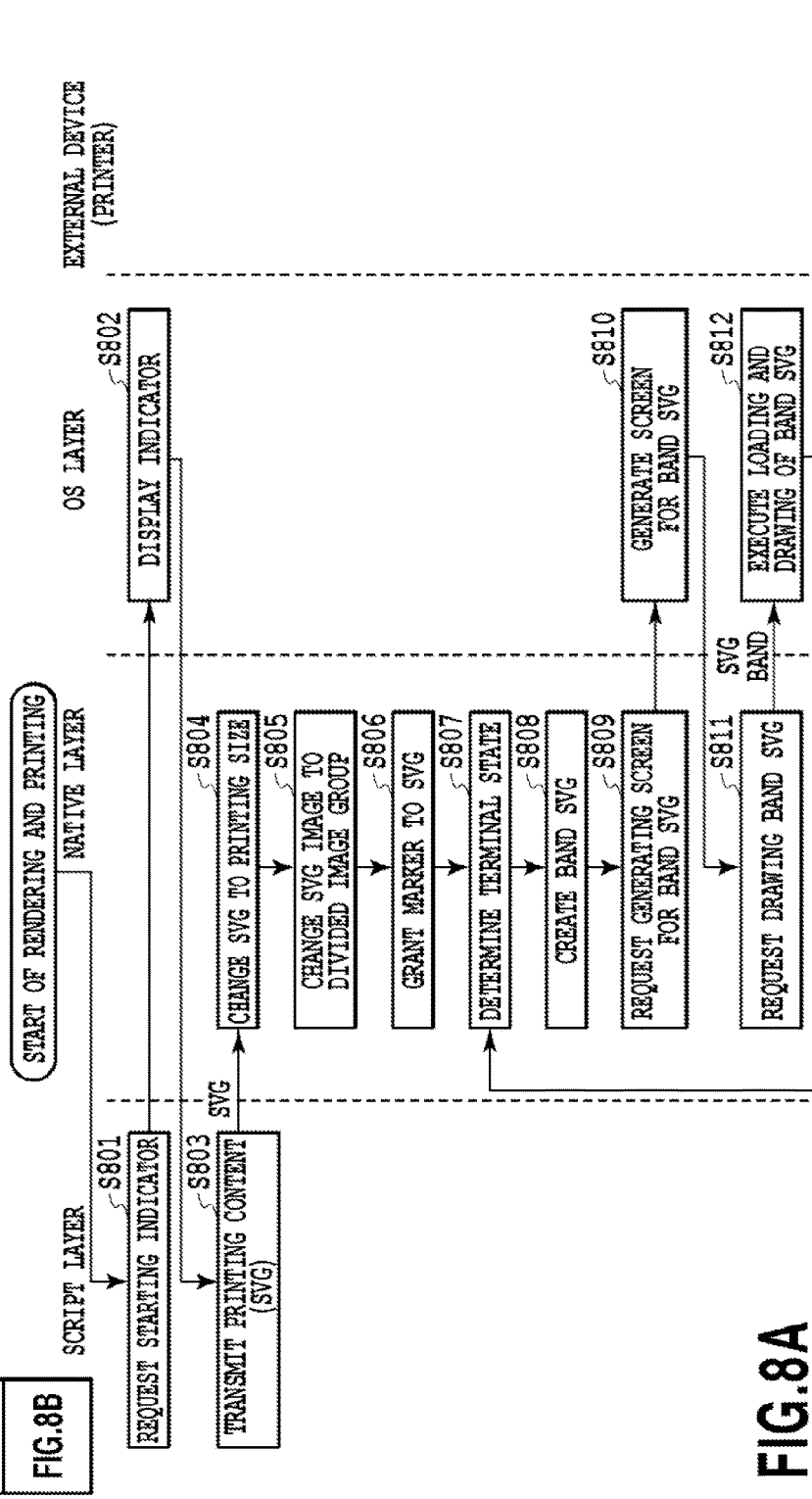

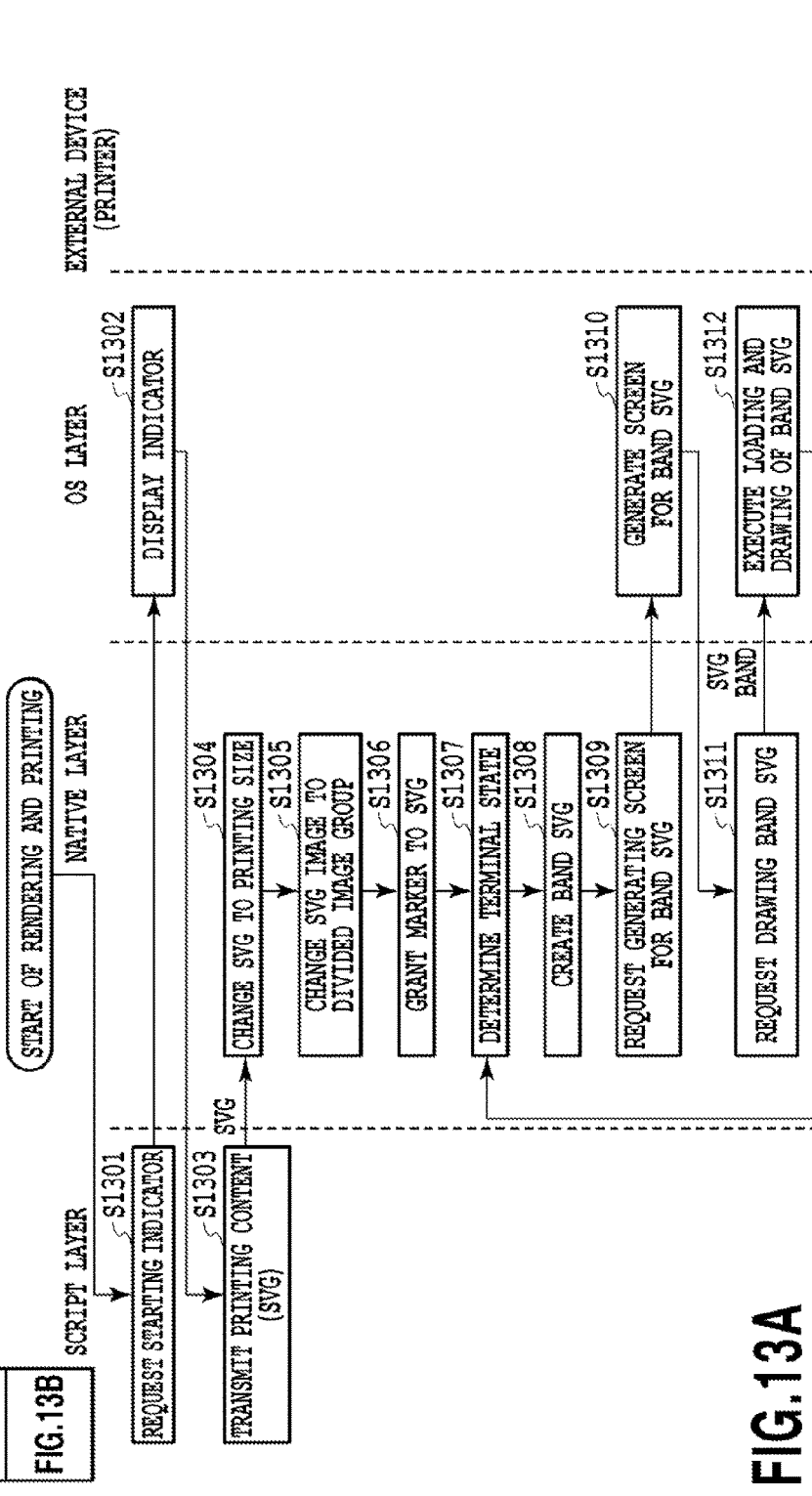

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium, and in particular, relates to an application that operates in the information processing apparatus such as a portable information terminal.

Description of the Related Art

As an example of this kind of application, an application for printing makes processing for printing such as rasterizing (hereinafter referred to as "rendering") as disclosed in Japanese Patent Laid-Open No. 2008-108006. One example of this printing processing is as follows. A content described with a command of a drawing engine of an OS is converted into a page description language (PDL) format and inputted into a printer driver. In the printer driver, processing of converting the content of a PDL format to generate an image constituted by predetermined resolution pixels, that is, rendering processing is made, depending on the type, size, print quality, and the like of paper set by a user via a displayed dialogue. Moreover, the rendered image undergoes color conversion processing such as color gamut conversion and color separation and further undergoes quantization processing by dithering, error diffusion, and the like, and then, is transmitted to a printer in a state in which a predetermined printer control command is given.

Here, in the above series of processing for printing, rendering and subsequent color conversion are made per band for a plurality of bands obtained by dividing an image for one page. Further, transmission to the printer includes a case of transmission per band unit for every completion of the rendering per band and a case of transmission at the time of completion of processing for one page. In this regard, in the former case, since printing starts on the printer side upon receiving the transmission per band unit, the period of time from a printing instruction given by a user to the start of printing by the printer becomes shorter.

However, there is a case where an application for printing, which is in operation on an information processing apparatus, is transferred to background upon activation of other processing. For example, in a portable information terminal such as a mobile phone, there is a case where a printing application is transferred from foreground to background upon activation of processing for a phone call from the outside during execution of printing processing. Further, in the background, there may be a case where the application is erased from a memory if a memory capacity available for the transferred application becomes small. Particularly, since a relatively large amount of memory is required during the execution of the above-described printing processing, the printing application is highly likely to be deleted from the memory. As such, if the application under execution of printing processing is deleted from the memory, a communication with the printer is interrupted, for example, and as a result, an inconvenience may occur such that paper is forcibly ejected in the middle of the printing and the whole printing ends in vain.

In a case where printing processing such as the above-described rendering is executed and data is transmitted to the printer after completing the processing for one page, an image to be rendered has a relatively high resolution, thereby causing the printing application to use a large amount of memory. Therefore, in this case as well, after the application is transferred to the background, the application is even highly likely to be deleted from the memory. Moreover, if the application is deleted, a print job once instructed by the user is to be cancelled, and, although the timing is prior to the transmission of data to the printer, an inconvenience may similarly occur on printing processing.

Incidentally, processing that is to be a trigger to transfer the printing application to the background is not limited to the above-described phone call, but automatic activation of a video call application, for example, may also be a trigger to transfer the printing application to the background.

SUMMARY OF THE INVENTION

The present invention has been made in consideration of the above problem to be solved, and an object of the present invention is to provide an information processing apparatus, an information processing method, and a storage medium which can reduce the possibility of erasing an application that operates on the information processing apparatus from a memory even at the transition of the application to background.

A first aspect of the present invention is an information processing method for causing an OS to execute predetermined processing in response to executing a predetermined application by a processor, the method comprising the steps of:

determining, in response to the execution of the predetermined application by the processor, whether the predetermined application is executed in a foreground or executed in a background by the OS; and controlling, in response to the execution of the predetermined application by the processor, to cause the OS to execute the predetermined processing using a predetermined memory area based on a result of the determination in the determining step, wherein, in the controlling step, in a case where the predetermined application is executed in the foreground, the OS is caused to execute the predetermined processing by using a first size memory area, and in a case where the predetermined application is executed in the background, the OS is caused to execute the predetermined processing by using a second size memory area that is smaller than the first size memory area.

A second aspect of the present invention is an information processing apparatus for causing an OS to execute predetermined processing in response to executing a predetermined application by a processor, the information processing apparatus comprising:

a determining unit configured to determine, in response to the execution of the predetermined application by the processor, whether the predetermined application is executed in a foreground or executed in a background by the OS; and a controlling unit configured to cause the OS, in response to the execution of the predetermined application by the processor, to execute the predetermined processing using a predetermined memory area based on a result of the determination in the determining unit, wherein, in the controlling unit, in a case where the predetermined application is executed in the foreground, the OS is caused to execute the predetermined processing by using a first size memory area, and in a case where the predetermined application is executed in the background, the OS is caused to execute the predetermined processing by using a second size memory area that is smaller than the first size memory area.

A third aspect of the present invention is a non-transitory computer readable storage medium storing an information processing program for causing an OS on a computer to perform predetermined processing in response to executing a predetermined application by a processor, the storage medium comprising the steps of:

determining, in response to the execution of the predetermined application by the processor, whether the predetermined application is executed in a foreground or executed in a background by the OS; and controlling, in response to the execution of the predetermined application by the processor, to cause the OS to execute the predetermined processing using a predetermined memory area based on a result of the determination in the determining step, wherein, in the controlling step, in a case where the predetermined application is executed in the foreground, the OS is caused to execute the predetermined processing by using a first size memory area, and in a case where the predetermined application is executed in the background, the OS is caused to execute the predetermined processing by using a second size memory area that is smaller than the first size memory area.

According to the above structure, the possibility in which an application that operates on the information processing apparatus is erased from a memory at the transition of the application to the background can be reduced.

Further features of the present invention will become apparent from the following description of exemplary embodiments with reference to the attached drawings.

BRIEF DESCRIPTION OF THE DRAWINGS

FIG. 8 is a diagram showing the relationship of FIGS. 8A and 8B;

FIG. 8A is a flowchart showing the details of rendering and printing in Step S35 shown in FIG. 3;

FIG. 13 is a diagram showing the relationship of FIGS. 13A and 13B;

FIG. 13A is a flowchart showing the details of rendering and printing according to a third embodiment of the present invention.

DESCRIPTION OF THE EMBODIMENTS

The embodiments of the present invention will be explained below in detail with reference to the drawings.

First Embodiment

With respect to a photo print application operating on a portable information terminal as one embodiment of a printing application of the present invention, explanations on a procedure of making various image processing for an image selected by a user and then of printing a resultant printing content will be given below. In the present embodiment, as the photo print application, a form of a so-called hybrid application which is a mixture of a Web technique and a native technique will be explained.

<Explanation on Hardware Configuration>

Figure 1:
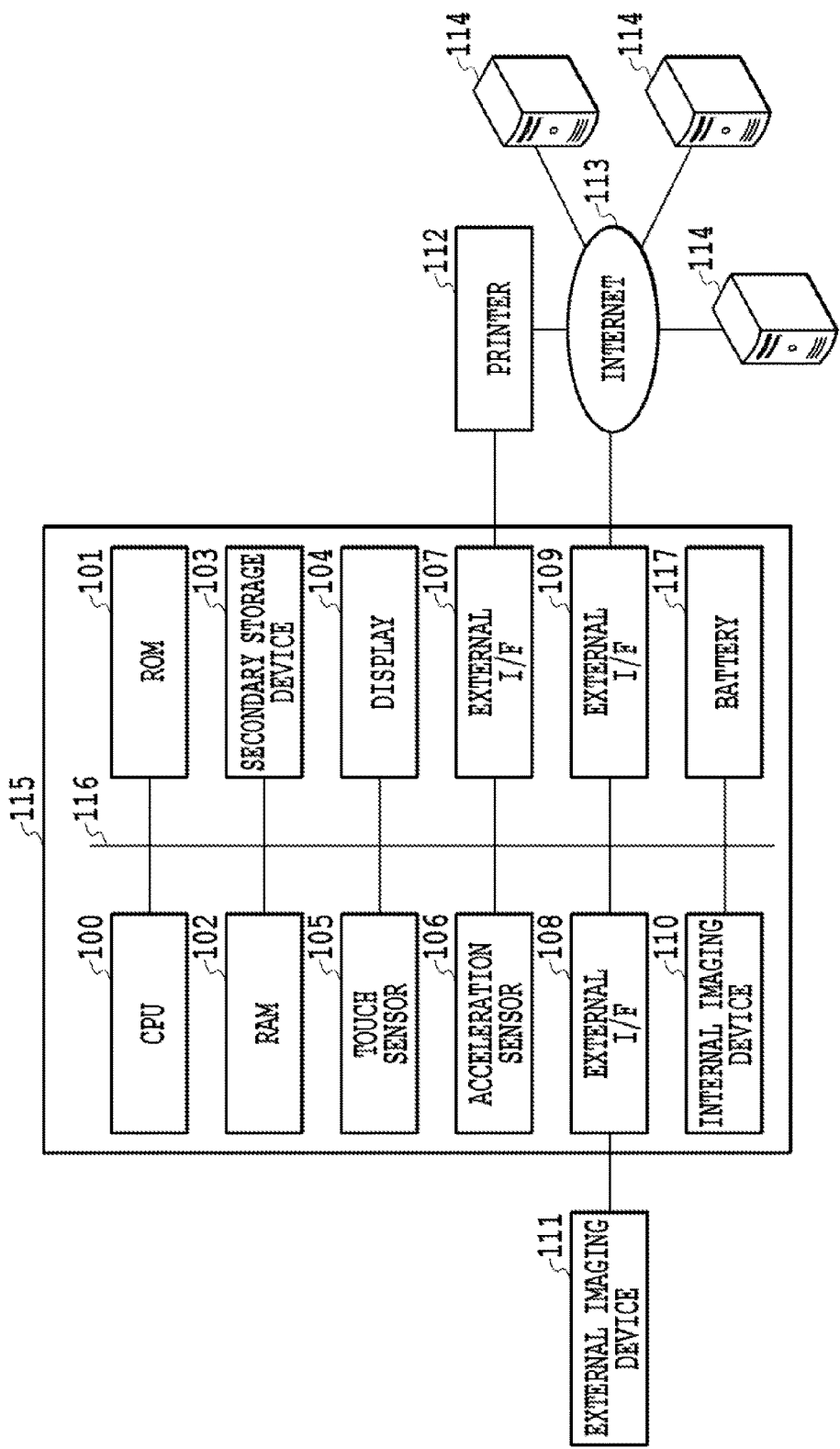
FIG. 1 is a block diagram showing a configuration of a portable information terminal which is an embodiment of an information processing apparatus of the present invention.

FIG. 1 is a block diagram mainly showing a configuration of the portable information terminal, such as a smartphone and a portable phone, which is one embodiment of an information processing apparatus of the present invention. In FIG. 1, a CPU (central processing unit/processor) 100 executes various processing which will be explained below in accordance with a program corresponding to each processing. It should be noted that, although one CPU 100 is shown in the illustrated example, the present invention may be configured by a plurality of CPUs or CPU cores. In this case, the configuration of a multi-processor may be used. A ROM 101 stores a program to be executed by the CPU 100. A RAM 102 is a memory for temporarily storing various information upon executing a program by the CPU 100.

A secondary storage device 103 is constituted by a hard disk, a flash memory, and the like, and is a storage medium for storing data such as a database which holds a processed result of analyzing files and images, for example, and for storing various programs. A display 104 displays a user interface (UI) for accepting operation to realize various processing and displays various information such as a processed result of executed processing. The display 104 may also include a touch sensor 105. As the UI to be displayed on the display 104, there is an application screen as will be described later in FIG. 9. Image data obtained by imaging using an internal imaging device 110 is stored in the secondary storage device 103 after undergoing predetermined image processing. Further, image data can be read from an external imaging device 111 connected via an external interface (hereinafter referred to as "I/F") 108.

The information processing apparatus 115 includes an external I/F 109 to make communications via a network 113 such as the Internet. Further, the information processing apparatus 115 can also obtain image data from a server 114 which is connected to the network 113 via the external I/F 109. An acceleration sensor 106 can obtain acceleration information relating to the position and attitude of the information processing apparatus 115 itself.

The information processing apparatus 115 is connected to a printer 112 via an external I/F 107, and can output printing data which is constituted by image data and the like. In addition, the information processing apparatus 115 is connected to the network 113 via the external I/F 109, and accordingly, can transmit required data to the printer 112 and can receive required data from the printer 112.

The external I/Fs 107, 108, and 109 are interfaces having communication modes of either a cable communication or a wireless communication, and making communications with an external device (the printer 112 or the server 114) in accordance with the communication mode to be used. The cable communication includes, for example, USB and Ethernet (registered trademark), and the wireless communication includes a wireless LAN, NFC, Bluetooth (registered trademark), and infrared communication. Further, in a case of using the wireless LAN for wireless communication, there may be a mode of directly connecting between apparatuses or a mode of connecting the apparatuses via a relay unit such as a wireless LAN router. Moreover, although the external I/Fs 107 to 109 are individually configured in the example shown in FIG. 1, they may be configured in an integral manner.

A power required for operating the information processing apparatus 115 is supplied from a battery 117. Various components included in the information processing apparatus 115 are interconnected via a control bus/data bus 116, and the CPU 100 controls each of these various components via the control bus/data bus 116.

According to the present embodiment, the information processing apparatus 115 is a location of executing software (software executing environment) of a program or the like to be executed by a control unit (CPU 100) included in the information processing apparatus 115.

<Software Configuration>

Figure 2:
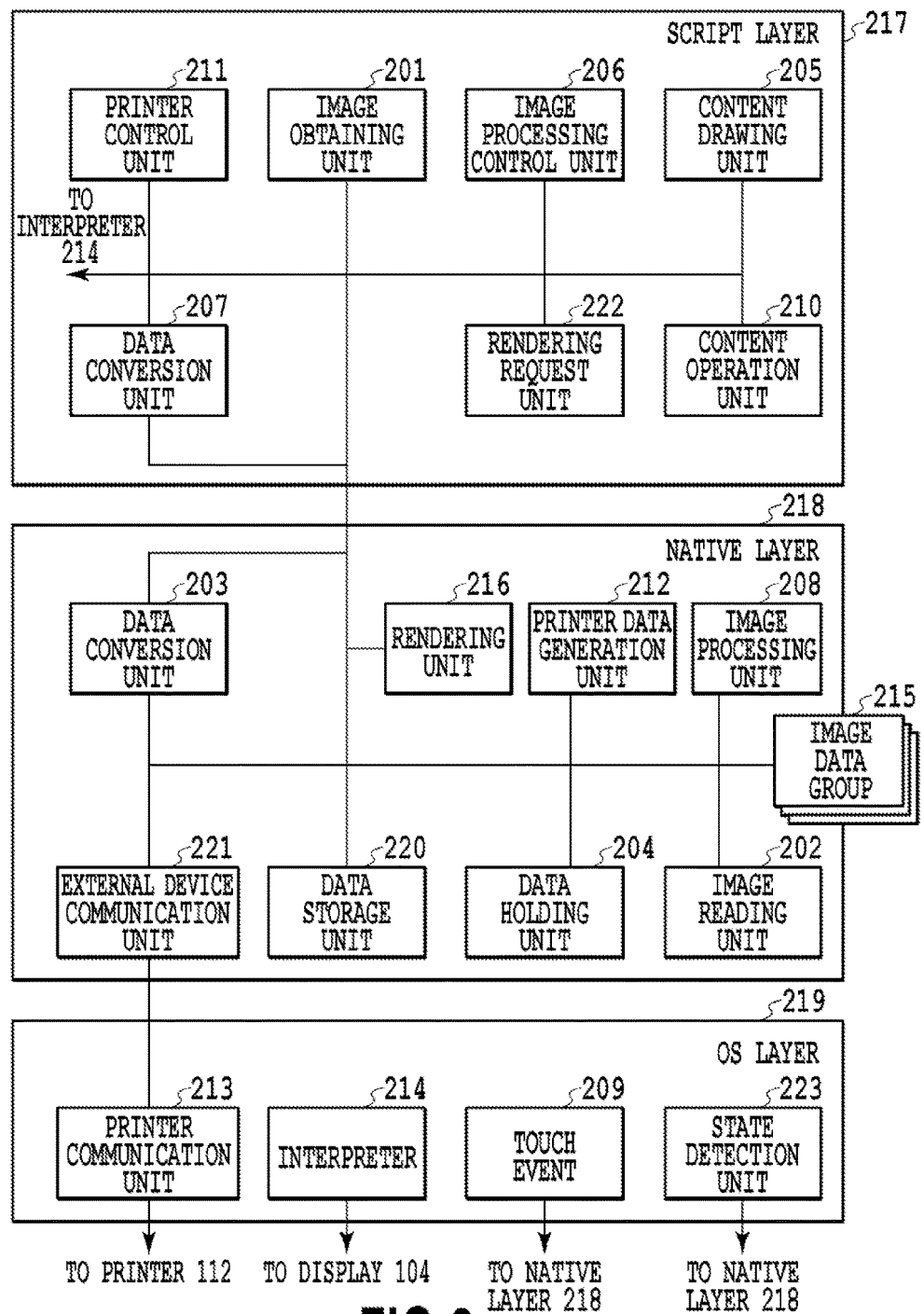
FIG. 2 is a block diagram showing a configuration of software which operates on the information processing apparatus shown in FIG. 1.

FIG. 2 is a block diagram showing a configuration of software which operates on the information processing apparatus 115 shown in FIG. 1. The information processing apparatus 115 executes a program corresponding to each of a script layer 217, a native layer 218, and an OS layer 219. Processing in each of these layers is achieved such that the CPU 100 reads out and executes the corresponding program stored in the ROM 101 or the secondary storage device 103.

The script layer 217 is a program layer in which an instruction set (content drawing, image display, replay of a moving image, and the like) is described in text data by using a Web standard language such as HTML5, CSS3, and JavaScript (registered trademark). In the script layer 217, various instruction sets of text data are to be interpreted and executed in an application execution environment by using a processor (e.g., the CPU 100) which exists in the application execution environment. As embodiments, a case of dynamically interpreting instruction sentences per line for every execution, a case of interpretation at the time of activating an application, a case of interpretation at the time of installing the application to the information processing apparatus 115, and the like may be considered. Processing to be made in the script layer 217 and its content is hereinafter referred to as a script. As an example of a form to interpret an instruction in the script within the information processing apparatus 115, a function of an interpreter included in the native layer 218 and the OS layer 219 is used. According to the present embodiment, most of the UI of the application is assumed to be described in the script layer 217.

The native layer 218 is a program layer describing an instruction set interpreted (compiled) beforehand other than in the application execution environment. As a mode, a code described in a high-level language such as C or C++ is compiled beforehand in a PC of an application developer or its server and forms the set of instructions interpretable by the CPU 100. Processing to be made in the native layer 218 and its content and invoking a function of the later-described OS layer 219 from the native layer 218 are hereinafter altogether referred to as a native. It should be noted that Java (registered trademark) is used as another implementing system of the native layer 218. Java is a high-level language similar to C/C++, and is interpreted into an intermediate code beforehand in a development environment at the time of application development. The interpreted intermediate code operates in a Java virtual environment included in each OS. In the present embodiment, such a program mode may be included as one type of native layer 218.

The OS layer 219 corresponds to an operating system (OS) of the information processing apparatus 115. The OS layer 219 has a role of providing the use of a hardware function to an application and an inherent function. The OS layer 219 includes an API and can use a function from the script layer 217 and the native layer 218.

Furthermore, according to the present embodiment, allowing invocation of the native layer 218 from the script layer 217 is referred to as binding or a bind. Each of the native functions includes an API, and the API is invoked by the script to allow the use of the native function. Such a binding function is a function that is typically included in each OS as a standard. Further, according to the present embodiment, an application including the script layer 217 and the native layer 218 is referred to as a hybrid application.

Processing or functions in each layer of the above-described software configuration will be explained below.

An image obtaining unit 201 in the script layer 217 requests the native layer 218 to obtain image data. The request by the image obtaining unit 201 is made by using, for example, a method of designating a path of an image and a method of prompting a dialogue display. An image reading unit 202 in the native layer 218 obtains image data from an image data group 215. A method of obtaining image data from the image data group 215 depends on a request by the image obtaining unit 201 of the script layer 217. Requesting methods include selecting one from dialogue boxes provided on the UI and selecting an image directly from the path of the image. At the time of reading an image, a unique ID is allocated to the image. This ID can be used in a case of designating an image in the native layer 218 from the script layer 217.

A data conversion unit 203 in the native layer 218 converts data (e.g., image data and parameters of a binary format) in the native layer 218 into data (e.g., image data of a text format (BASE64) and JSON) of a format that can be used in the script layer 217. Meanwhile, the data conversion unit 203 converts data (e.g., image data of a text format (BASE64) and JSON) transmitted from the script layer 217 into data (e.g., image data and parameters of a binary format) of a format that can be used in the native layer 218. A data conversion unit 207 in the script layer 217 converts data (e.g., a processing parameter of a text format) in the script layer 217 into data (e.g., a processing parameter of a text format (JSON format)) of a format that can be used in the native layer 218.

A data holding unit 204 in the native layer 218 holds on-memory image data read by the image reading unit 202, image data that underwent image processing by an image processing unit 208, and a divided image group. The held image data is, for example, rasterized to RGB image data, and has a format capable of executing image processing immediately.

A content drawing unit 205 in the script layer 217 describes a content for printing using a Web standard language. This description reflects a script operated in a content operation unit 210. The script of the content described by the content drawing unit 205 is interpreted by an interpreter 214 in the OS layer 219 and displayed on the display 104.

An image processing control unit 206 in the script layer 217 determines a correction parameter used for image processing and an image to be processed and requests the image processing unit 208 to make image processing. The correction parameter is converted into a format transmissible to the native layer by the data conversion unit 207 and then the resultant is transmitted to the native layer together with an ID of an image to be processed. The image processing unit 208 of the native layer makes image processing for an image designated by the image processing control unit 206. In this case, a manner of image processing to be made is determined by a parameter set by the image processing control unit 206. As to image designation, in addition to the method of using the above-described ID, a method of receiving a path of an image from the script layer, a method of receiving the whole image data, and the like are considered.

A touch event 209 in the OS layer 219 obtains information relating to a touch on the display 104. The information relating to a touch includes a touch detection on the display 104 and information regarding a touched position. The obtained information relating to a touch is transmitted to the content operation unit 210 of the script layer 217 via the native layer 218. In a case where image data is transmitted from the native layer 218 as a result of an image obtaining request, for example, the content operation unit 210 in the script layer 217 changes a script command so as to reflect the image data.

A printer control unit 211 in the script layer 217 controls a request for printer detection, display of a printer setting screen, and generation and transmission of printing information. In the printer setting screen, printer settings such as a paper size, a paper type, color/monochrome are made. Based on these set items, printer data is generated in a printer data generation unit 212. The printer data generation unit 212 of the native layer 218 generates data and commands required for printer communications based on a request from the printer control unit 211. The data required for printer communications refers to data in conformance with a communication protocol, and the commands refer to data for determining a printer's operation such as printing and scanning. Accordingly, the printer data generation unit 212 generates printer data including commands for determining the operation of the printer.

An external device communication unit 221 in the native layer 218 is an interface (IF) for communicating with an external device that is connected to the information processing apparatus 115 such as a printer. Here, the external device communication unit 221 transmits data received from the printer data generation unit 212, and receives information from the printer 112. According to the present embodiment, the external device communication unit 221 makes communication via a communication control unit 213 (also referred to as a printer communication unit) in the OS layer 219, but the external device communication unit 221 may directly transmit data to the external I/F 107. If the communication control unit 213 of the OS layer 219 is compatible with a communication protocol used by the external device, its function should be used, and if the communication control unit 213 is not compatible with a communication protocol used by the external device, the external device communication unit 221 makes communication in accordance with that communication protocol.

The interpreter 214 of the OS layer 219 interprets and executes an instruction described in a Web standard language generated in the script layer 217. For example, an instruction for image drawing and the like is executed through the interpreter 214 and is displayed on the display 104.

The image data group 215 is an area where image data is held. A data storage unit 220 functions to store image data held by the data holding unit 204 in the image data group 215 as necessary.

A rendering request unit 222 in the script layer 217 requests a rendering unit 216 in the native layer 218 to make rendering. In this case, a content described by the content drawing unit 205 is converted by the data conversion unit 207 and then the resultant is delivered to the rendering unit 216. In a case where processing is required before delivery to the rendering unit 216, the content operation unit 210 may be used to edit the description of the content. Further, in a case where the direct edition of the content description affects the UI, a copy of the content description will be made so as to be used for the above-described operation. The rendering unit 216 makes rendering for generating image data to be transmitted to the printer in accordance with a content received from the rendering request unit 222. This rendering includes, for example, generating an image in the script layer 217 with output resolutions to the printer 112. Further, a result of rendering in the native layer 218 and an image during generation are not displayed on the display 104.

A state detection unit 223 in the OS layer 219 detects the state of a device in use. For example, in a case where another notice such as an incoming call is made in the state of using an application, the occurrence of such an event or the change of a state is transmitted to the native layer 218.

<Processing Associated with User Operation>

Figure 3:
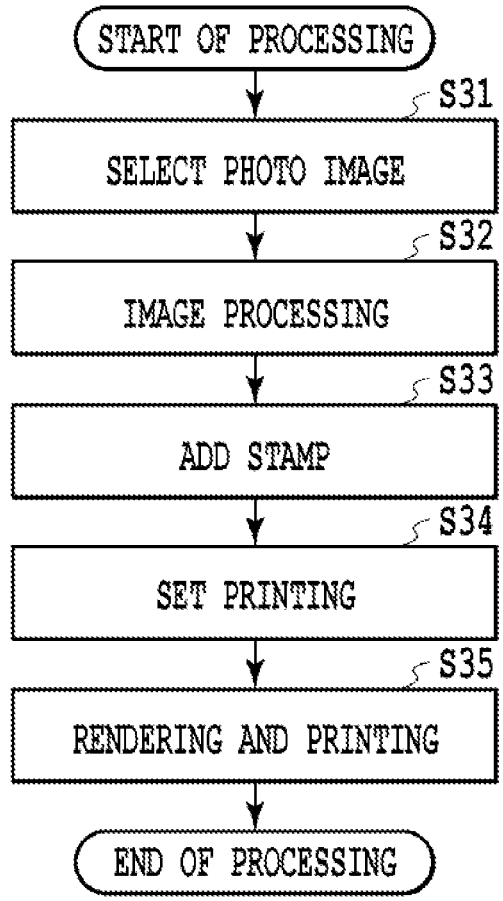
FIG. 3 is a flowchart showing an example of processing including user's operation in the information processing apparatus according to the present embodiment.

FIG. 3 is a flowchart showing an example of processing including user's operation in the information processing apparatus 115 according to the present embodiment, and shows processing for printing a photo image by the printer 112. Each of the steps of processing shown in FIG. 3 is achieved by the CPU 100 of the information processing apparatus 115 executing a program stored in the ROM 101 or the secondary storage device 103. Further, each step shown in FIG. 3 proceeds in accordance with user's operation on the application screen which is one of the UIs in the present embodiment.

Figure 9:
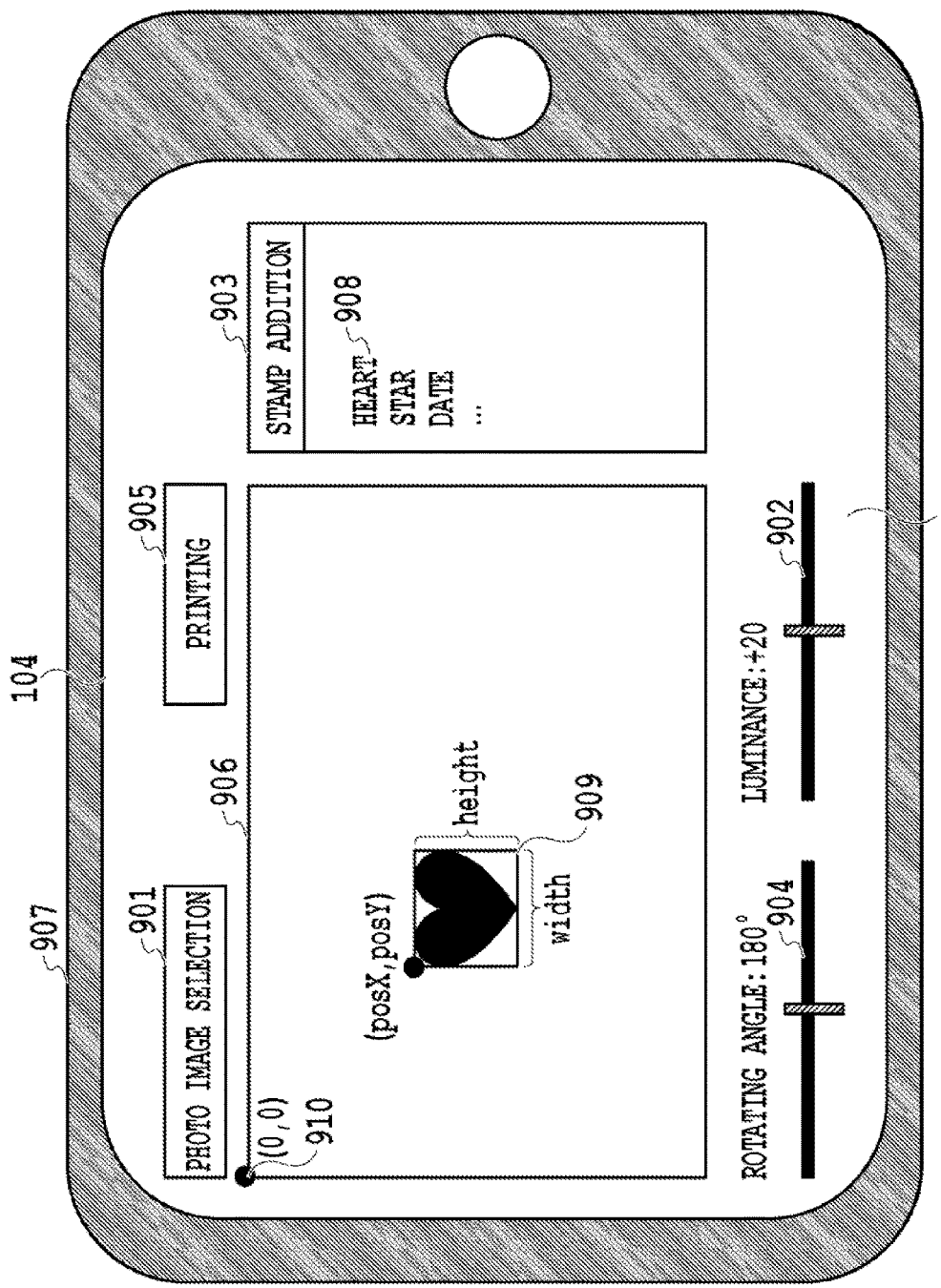
FIG. 9 is a diagram schematically showing an application screen in the information processing apparatus of the embodiment.

FIG. 9 is a diagram schematically showing an application screen 900 in the information processing apparatus 115 of the present embodiment. This application screen is displayed by the display 104 shown in FIG. 1. Moreover, this application screen 900 is generated by the script layer 217, and further, the operation on the application screen 900 is detected by, for example, the touch sensor 105 (FIG. 1).

In FIG. 3, first of all, upon detecting, in Step S31, user's operation (including a touch operation input; the same shall apply hereinafter) on a photo image selection button 901 in the application screen 900 shown in FIG. 9, the CPU 100 makes processing and displaying for a user in selecting an image in accordance with the user's operation. Once the user selects an image, the CPU 100 displays, after predetermined processing is executed in the native layer, the selected image on a drawing area 906 in the application screen 900. The details of this step will be described later in FIG. 4.

In Step S32, upon detecting user's operation on a slide bar 902 shown in FIG. 9 for adjusting luminance of a displaying image, the CPU 100 sets a correction parameter to be used at the time of image processing in accordance with the user's operation. Then, under the instruction of the execution, the CPU 100 displays, after image processing is made for the displaying image and predetermined processing is made in accordance with the set correction parameter, such processing content and processing result in the drawing area 906. The details of this step will be described later in FIG. 5.

In Step S33, upon detecting user's operation on a stamp addition button 903 shown in FIG. 9, the CPU 100 displays stamps. Moreover, upon detecting selection of a stamp by user's operation from the list of stamps, the CPU 100 adds and displays the selected stamp in the drawing area 906. Furthermore, granting a touch event (tapping or swiping) detection function to the stamp allows enlarging, downsizing, or moving the stamp. The detection function is included in the Web standard language as a standard, which corresponds to an addEventListener function. An example of reaction upon touching a stamp will be shown as follows:

```
var stamp = a stamp of a target;
stamp.addEventListener("touchstart", function(e){
//describe desired processing here when a stamp is touched
}, false);
```

The details of Step S33 will be described later in FIG. 6.

Next, in Step S34, upon detecting user's operation on a print button 905 shown in FIG. 9, the CPU 100 displays a setting screen 1001 (FIG. 10) for setting required information for printing. Here, the information required for the printing includes setting items such as a paper size, a paper type, printing sides (both-sided/one-sided), and colors (monochrome/color) as shown in the setting screen 1001 in FIG. 10. In addition, setting items that can be set depending on functions included in a printer to be used such as print quality and bordered/borderless are configured and displayed. The details of this step will be described later in FIG. 7.

Figure 10:
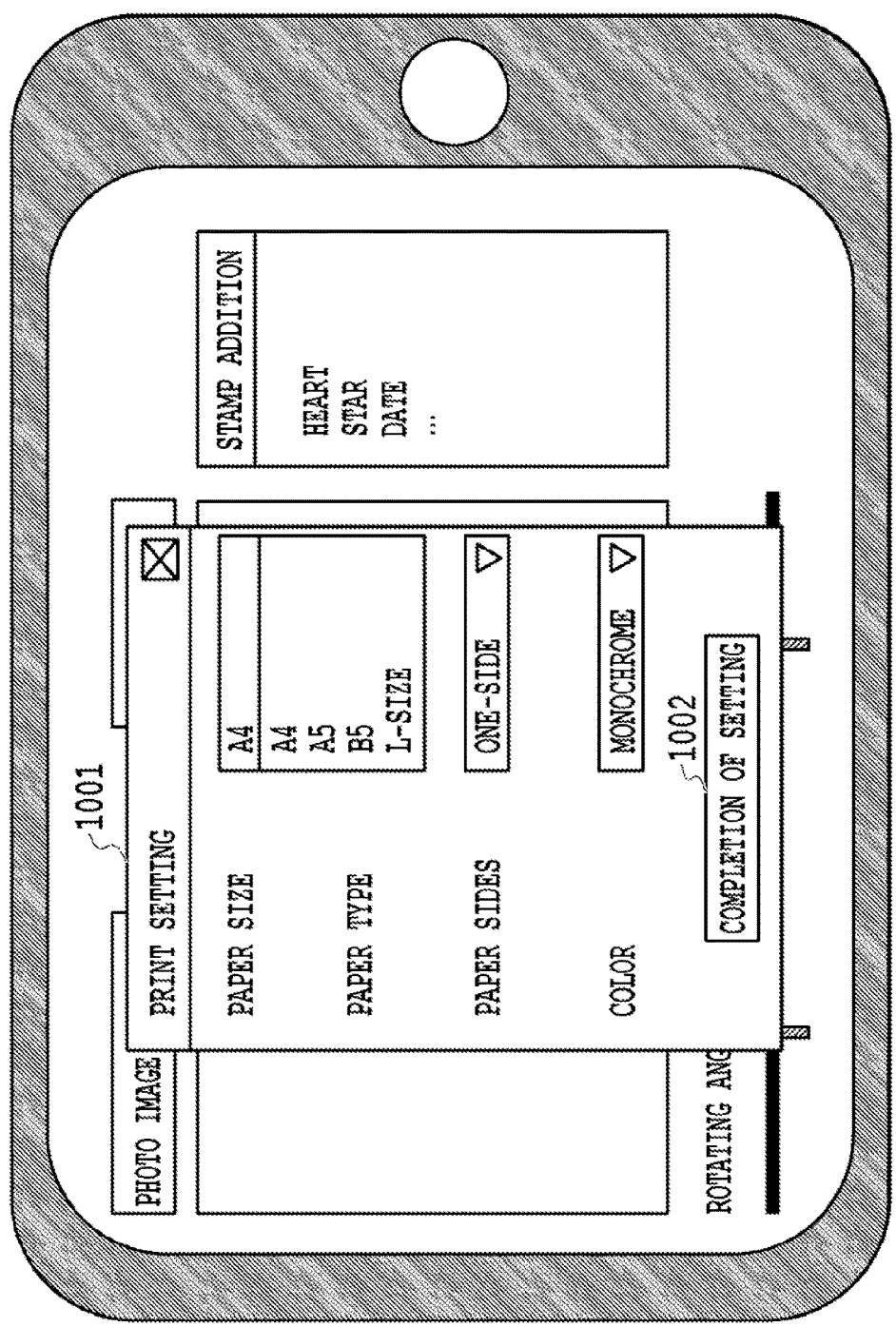
FIG. 10 is a diagram showing a setting screen for setting information for printing in the information processing apparatus of the embodiment.

Then, in Step S35, upon detecting user's operation on a setting completion button 1002 in the setting screen 1001 shown in FIG. 10, the CPU 100 executes rendering for converting an image displayed in the drawing area 906 into data for an output to a printer. Then, after creating data by rendering, the CPU 100 transmits the created printing data to the printer 112 together with a command for printer control. As a result of the above processing, the image selected by the user is printed by the printer 112.

Incidentally, the processing shown in FIG. 3 is merely one example, and the processing content is not limited to this, or processing order of the step group is not limited to this, either. Further, in the present embodiment, a first program layer including an instruction set interpreted and executed by the processor is defined as the script layer 217 and a second program layer including an instruction set interpreted beforehand by other than the processor is defined as the native layer 218. Moreover, a program including these first and second program layers implements a hybrid application.

<Photo Image Selection and its Image Processing>

Next, photo image selection and its associated processing executed in the information processing apparatus of the present embodiment as described above with reference to FIG. 3 will be explained in detail by referring to FIGS. 4 to 8.

Figure 4:
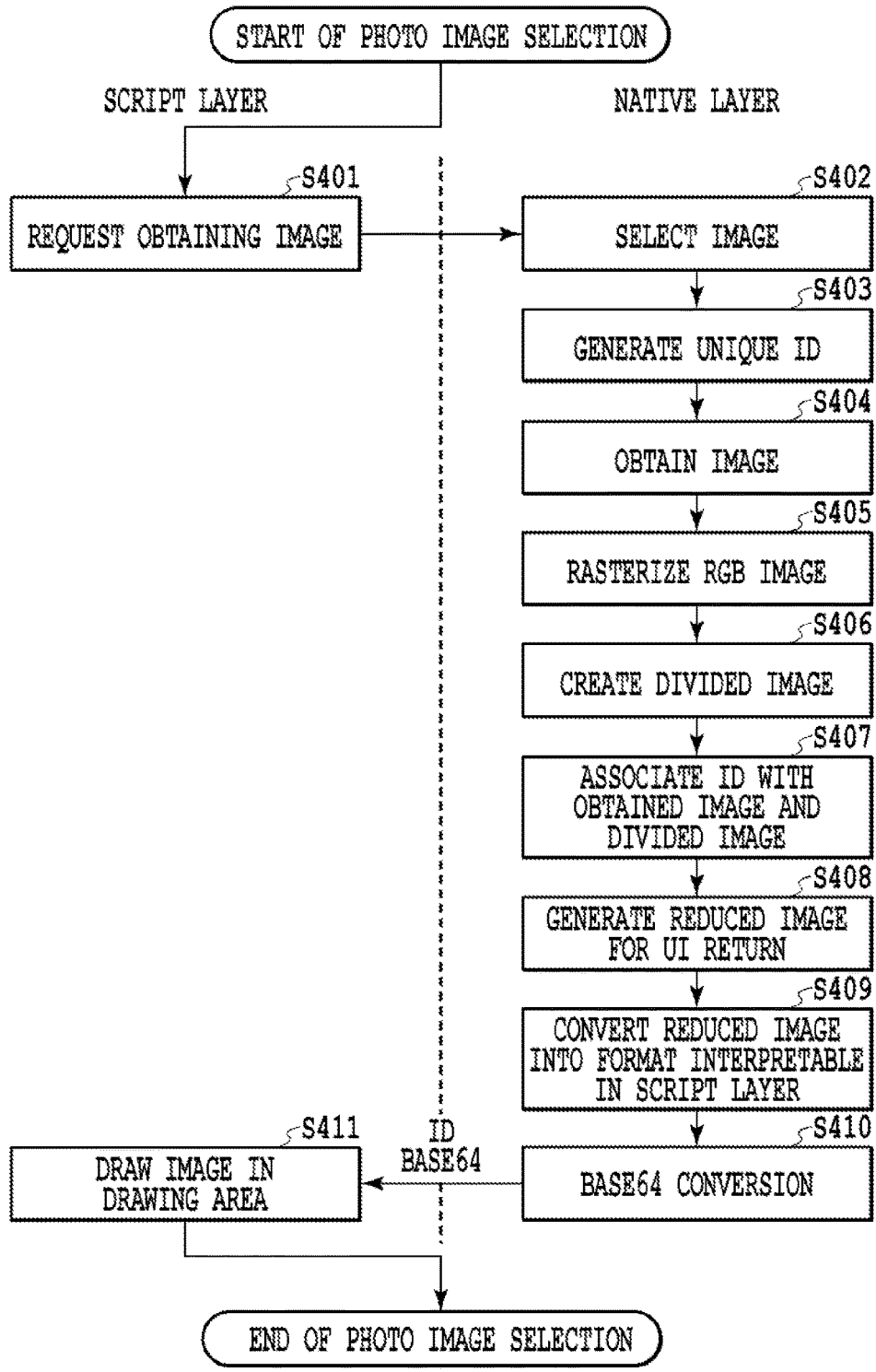
FIG. 4 is a flowchart showing the details of a photo image selection in Step S31 shown in FIG. 3.

FIG. 4 is a flowchart showing the details of a photo image selection in Step S31 shown in FIG. 3. It should be noted that, Steps S401 and S411 are processing executed by the CPU 100 using programs in the script layer 217, and Steps S402 to S410 are processing executed by the CPU 100 using programs in the native layer 218.

First of all, in Step S401, the CPU 100 requests the native layer 218 to select an image in accordance with user's operation on the photo image selection button 901. In the request, an image selection API unique to the native layer 218 is directly invoked from the script layer 217 by using a binding function. Here, in a case where an image selection API unique to the native layer is configured not to be directly invoked, a function of directly making invocation from the script layer 217 should be prepared in the native layer 218 to describe, within the function, a function of invoking the image selection API unique to the native layer. This is a method of preparing a wrapper in advance. Besides the above, a configuration of implementing an individual image selection UI may be adopted. Then, in Step S402, the CPU 100 displays the image selection UI on the display 104. As a result, one image is selected by user's operation on the displayed image selection UI. According to the present embodiment, a mode of selecting one image from an image folder in the device is exemplified, but the application of the present invention is not limited to this. For example, an image in the Internet or an image in a removable storage medium may be selected, or a captured image using a camera function in the device may also be selected. Next, in Step S403, the native layer 218 generates a unique ID. The ID may be in any form as long as a format that can be transmitted from the native layer 218 to the script layer 217 such as numerical values and character strings is used. It should be noted that the generation of IDs is not limited to the form of the native layer 218, but a method of generating IDs in the script layer 217 to transmit them to the native layer 218 may be adopted. In Step S404, the CPU 100 obtains a selected image. For example, in a case where the selected image is in the form of image file, the CPU 100 opens the file and reads its content.

Figure 11:
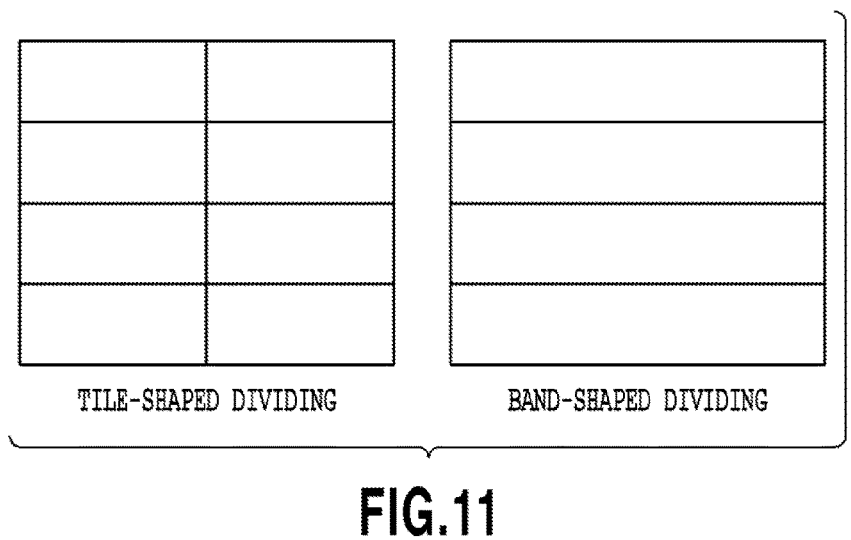
FIG. 11 is a diagram showing two forms, a tile shaped and a band shaped, of block images dividing an image.

Next, in Step S405, the CPU 100 rasterizes the obtained image in an RGB space. Here, the RGB data is held in the native layer 218, but the present invention is not limited to this. For example, JPEG (Joint Photography Expert Group), PNG (Portable Network Graphics), and RGBA formats may be used for the holding. The RGBA format refers to a combination of RGB (red, green, and blue) components of image data and an A component as a transparency. In Step S406, the CPU 100 divides the rasterized RGB data and creates RGB data for every small area. The RGB data for every small area is called a "block image." Here, the block image may be either tile shaped or band shaped. The tile shape refers to a case where both of width and height of the block image is less than the width and height of original data before division. Meanwhile, the band shape refers to a case where only either one of width and height of the block image is less than that of the original data before division. These examples are shown in FIG. 11. According to the present embodiment, the block image adopts the method of dividing the original image into two in the band shape. For the number of blocks to be divided, any methods, such as a method of designating specific number of blocks or a method of providing one block image having less than the specific number of pixels, may be adopted. In addition, the sizes of the block images may not necessarily be uniform. For example, in a case of dividing the image of 3000×4000 pixels into three, manners of division may be consisted of 3000×1500 pixels, 3000×1500 pixels, and 3000×1000 pixels. In subsequent Step S407, the CPU 100 stores a block image group generated with the rasterized RGB data in the data holding unit 204 by associating it with an ID generated in Step S403. Here, an association manner includes, for example, creating an object having the ID and the RGB data and block image group to allow specifying the RGB data and block image group based on the ID. The manner of associating an ID is not limited to this, and any manner may be used as long as the RGB image and block image group can be specified by the ID. According to the present embodiment, the block image group is converted into a device independent bitmap (DIB) format which can be readily used in the script layer 217 and the resultant is stored on-memory. In this case, associating with the ID can be achieved by postscripting an ID to a predetermined name such as "block1_ID.bmp" and "block2_ID.bmp". Here, it is, of course, possible to use other than the DIB for an image format.

Next, in Step S408, the CPU 100 creates, from the RGB data, reduced RGB data to be used in the UI. For such reduction, a function in the OS may be used, or a configuration originally provided may be used. In a case where an image is large, reduction processing is made for an image of a script depending on the size of a UI and the resolution of a display. Here, if an image having the excessive number of pixels is handled with respect to the UI in the script, processing load is burdened on the CPU and the large capacity of memory is required, thereby causing waste. Therefore, in the present embodiment, reduction processing is made to avoid such waste. As a level of reduction processing, for example, the displaying size of the display or the size of an area to display an image with the UI may be set as an upper limit so as to control making reduction processing with respect to the image having the number of pixels exceeding the upper limit. Then, in Step S409, the CPU 100 converts the image data of the reduced RGB created in Step S408 into image data of a format (supportable format) that can be used in the script layer 217. According to the present embodiment, the data format to be converted is the JPEG (Joint Photography Expert Group). Next, in Step S410, the CPU 100 converts the JPEG-format data into BASE64 data and transmits it to the script layer 217. This is because JPEG data handled in the native layer is a format that cannot be directly used in the script layer 217. The BASE64 is an encoding method for handling binary data as character string data, and is a data format that can be used with the JavaScript.

As a method of handling an image in the script layer 217, a form of once storing the JPEG in a file in the native layer and then using its storage path. However, according to the present embodiment, the form of using BASE64 data is adopted. Specifically, in Step S411, the CPU 100 receives the BASE64 data converted in the native layer 218 and renders an image in a drawing area. To be more specific, the CPU 100 transmits the BASE64 data designated in the script layer to the interpreter 214 of the OS layer. Then, the interpreter 214 interprets the script of the BASE64 data and displays the resultant in the drawing area as an image. An example of a sample code that reflects the BASE64 data to the drawing area will be shown below.

```
var Base64Data = BASE64 data from native layer;
var ID = a unique ID generated in native layer;
//designate area desired to reflect image
var svg = "http://www.w3.org/2000/svg";
var xlink = "http://www.w3.org/1999/xlink";
var img = document.createElementNS(svg, "image");
img.setAttributeNS(xlink, "href", Base64Data);
img.setAttribute("id", ID);
img.setAttribute("width", 200);
img.setAttribute("height", 200);
var target = document.getElementById("ID of SVG of target to added");
target.appendChild(img);
```

In the above example, a manner of dynamically adding SVG to the drawing area 906 is shown. A later-described stamp can also be added to the drawing area 906 in the same operation.

<Image Processing>

Figure 5:
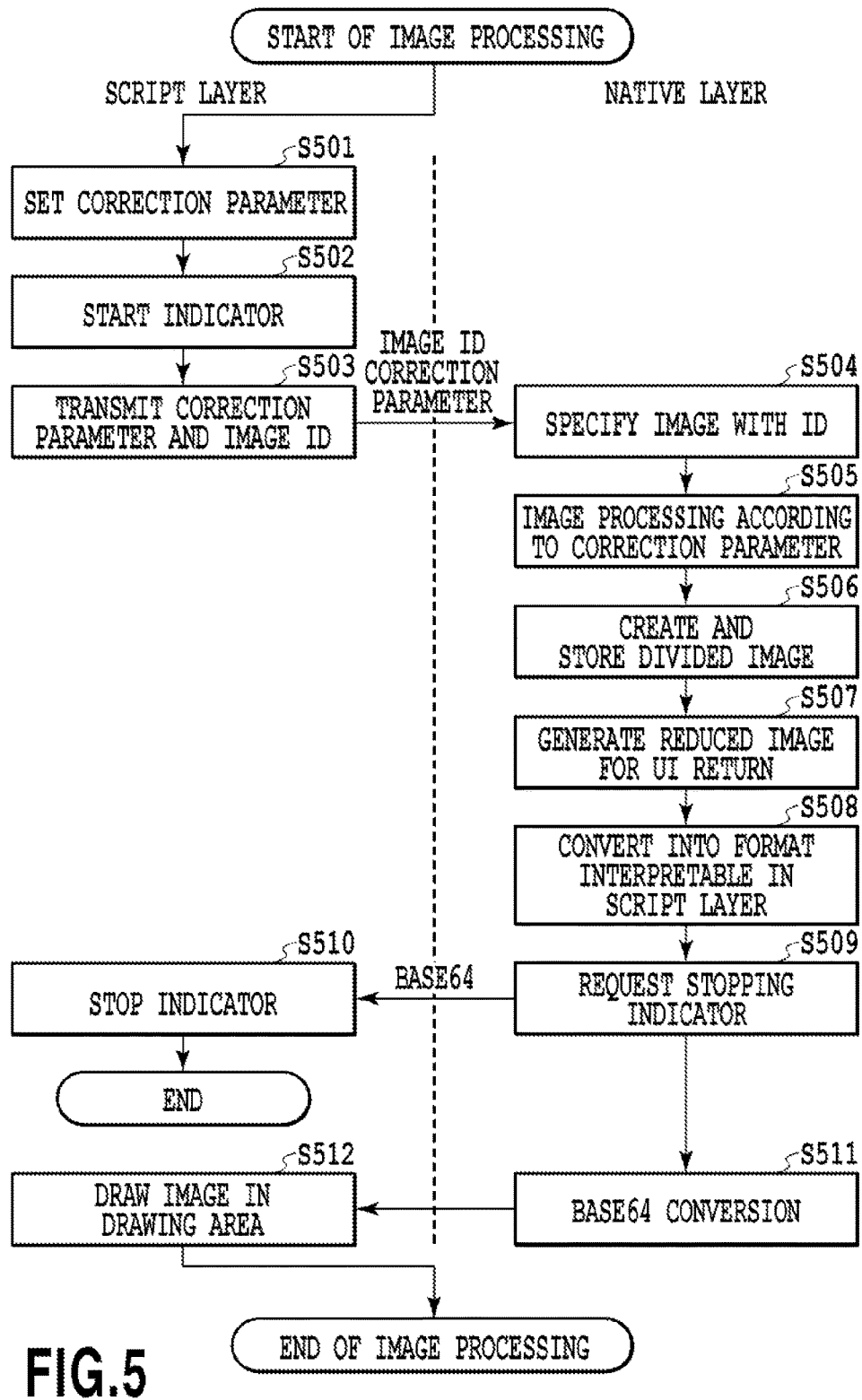
FIG. 5 is a flowchart showing the details of image processing in Step S32 shown in FIG. 3.

FIG. 5 is a flowchart showing the details of image processing in Step S32 shown in FIG. 3. It should be noted that Step S501 to S503, S510, and S512 are processing executed by the CPU 100 using programs in the script layer 217, and Step S504 to S507 and S509 are processing executed by the CPU 100 using programs in the native layer 218. Here, an example of image processing of changing brightness of an image based on a set value of the slide bar 902 operated by a user will be explained.

In Step S501, a correction parameter is to be set. The correction parameter is set in accordance with a value set in the slide bar 902. In Step S502, the CPU 100 activates an indicator and displays it on the display 104. Here, the indicator is an indication to notify user that processing is in operation, and includes a progress bar, a clock mark, and rotation of a figure. The indicator is generally displayed in a case where processing requires relatively long time for execution. Further, according to the present embodiment, the startup and stop of the indicator are made in the script layer 217, but it is possible to use the indicator in the native layer 218. In Step S503, the CPU 100 transmits the correction parameter that has been set in Step S501 and the ID (the ID of the image generated in Step S403) of the image to execute image processing to the native layer 218 as a JSON (JavaScript Object Notation) format. The JSON is a method of describing data that can be used in JavaScript, and is one of data formats that can be transmitted to and received from the native layer 218. For example, the following description is an example of transmitting an ID and a brightness correction value.

```
var json = {
  ID : image ID to be image processed,
  Brightness : 20
};
```

In Step S504, the CPU 100 specifies an RGB image rasterized in Step S405 in FIG. 4 based on an ID obtained from the script layer 217. Next, in Step S505, the CPU 100 executes brightness correction for the RGB image based on the obtained correction parameter. According to the present embodiment, based on the value "20," for example, set by the operation of the slide bar 902, processing of adding 20 to the R, G, and B values of all pixels is made. As to the image processing, by adding image processing information other than the correction parameter, image processing to be executed can be increased. In other words, publicly-known monochrome conversion, publicly-known sepia-color conversion, "ImageFix," "RedeyeFix," and "SmartSkin," for example, can be added. Here, the "ImageFix" is a function (face detection function) of automatically analyzing a photo image by using human's face detection and scene analysis unit to adjust appropriate brightness and white balance. Also, the "RedeyeFix" is a function (red-eye detection function) of automatically detecting a red-eye image among images for correction. Further, the "SmartSkin" is a function of detecting human's face from the photo image and suitably working on the skin region of the face. It should be noted that the types of image processing functions are not limited to these, and various kinds of image processing may be used according to its usage and purposes. Furthermore, the image processing may use a function provided by the OS layer 219, and even in such a case, the configuration of the processing is the same as in this embodiment.

Next, in Step S506, the native layer 218 creates a block image group from the image-processed RGB image in Step S505 in the same processing as that in Step S406. Here, the block image group associated with the ID in Step S407 is replaced with the block image group created in Step S506, and the block image group created in Step S407 is discarded. Next, in Step S507, a reduced RGB image to be used on the UI is created from the image-processed RGB image in Step S505. In Step S508, the CPU 100 converts the reduced RGB image created in Step S507 into image data of a format (supportable format) that can be used in the script layer 217. Here, as in Step S409, data is converted into a JPEG format. In subsequent Step S509, the CPU 100 requests the script layer 217 to stop the indicator. This can be executed by invoking a function of stopping the indicator defined in the script layer 217 from the native layer 218.

In Step S510, the CPU 100 stops the indicator and erases the indicator from the displaying on the display 104. On the other hand, in Step S511, the CPU 100 converts the converted JPEG-format data into BASE64 data and transmits it to the script layer 217. Then, in Step S512, the CPU 100 receives the BASE64 data converted in the native layer 218 and accordingly changes the image having drawn in Step S411. To be more specific, the CPU 100 transmits the BASE64 data designated in the script layer to the interpreter 214 of the OS layer. Then, the interpreter 214 interprets the script of the BASE64 data and displays the drawing result of the image data in the already-existing drawing area. As a result of the above processing, image data in which image processing is applied based on the correction parameter is displayed.

According to the present embodiment, image processing starts as a result of the operation of the slide bar 902 shown in FIG. 9, but the form of the start is not limited to this. The form may be such that a plus button and a minus button are arranged on the screen, for example, and brightness is adjusted by every press of the buttons. In addition, the form may be depended on processing interlocking with a touch event such that brightness increases by touching the right half of an image and brightness decreases by touching the left half of the image. Further, the form of executing the whole image processing collectively at the time at which an instruction to execute image processing is given while only the correction parameter has been changed beforehand by user's operation. As such, various forms can be used for executing image processing.

<Adding Stamp>

Figure 6:
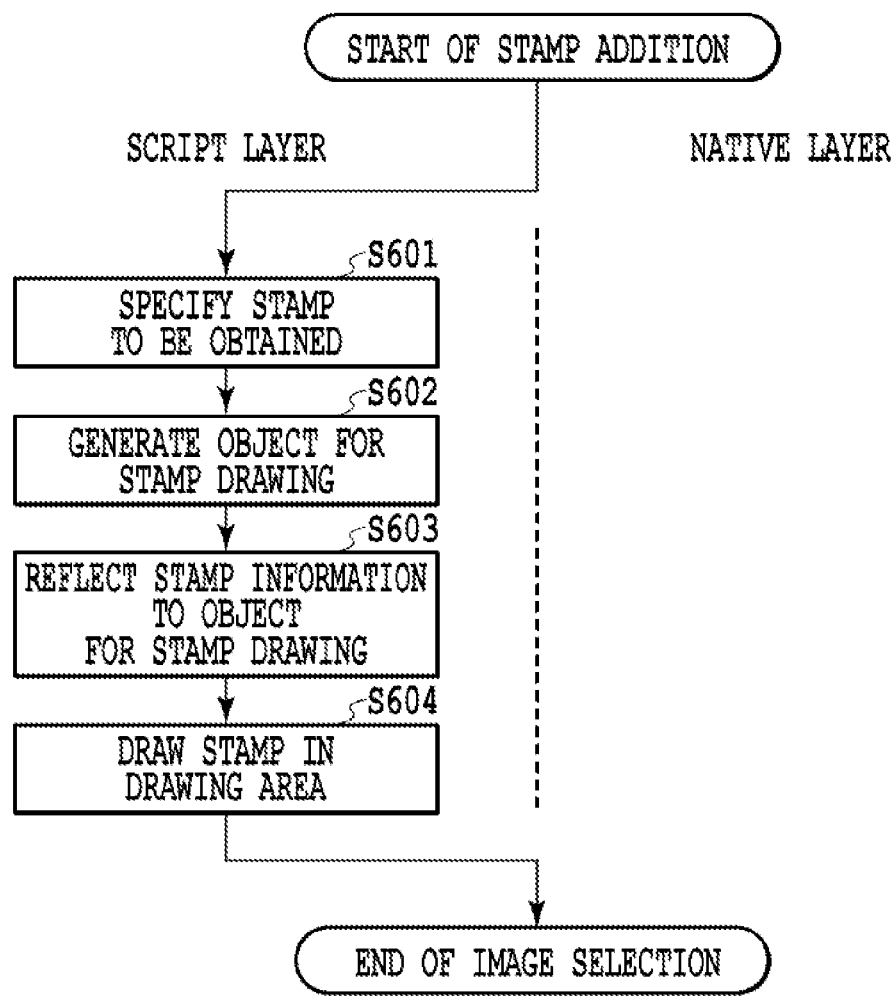
FIG. 6 is a flowchart showing the details of adding stamps in Step S33 shown in FIG. 3.

FIG. 6 is a flowchart showing the details of adding stamps in Step S33 shown in FIG. 3. In the following explanation, an example is given such that the stamp addition button 903 on the application screen 900 shown in FIG. 9 is pressed by user's operation to display the list of stamps and then a heart stamp 908 is selected. It should be noted that adding stamps is processing to be executed by the CPU 100 using a program in the script layer 217. Further, stamps to be used are held in advance by the application as a resource file.

In FIG. 6, the CPU 100 obtains, in Step S601, a path in which an image to be used as a stamp is stored. Since processing is made to read a predetermined file for a stamp, a configuration may be such that a path storing a heart stamp is returned after tapping the heart stamp 908 shown in FIG. 9. In Step S602, the CPU 100 creates an object for stamp drawing. Then, in Step S603, information of the obtained path in Step S601 is set on the created object for stamp drawing. Processing in Steps S602 and S603 can be executed in almost the same manner as in the case of adding an image in Step S411. An aspect different from that in Step S411 is that image information source is not the image data of BASE64 but the stamp path. Further, the touch event can be granted for the stamp. Granting the touch event allows obtaining information relating to touch operation as to whether the stamp has been tapped, swiped, or the like. The use of this information allows operation of moving stamps, enlarging or reducing stamps, and the like.

In Step S604, the content in Step S603 is interpreted by the interpreter 214 and a stamp is added to the drawing area 906.

<Printing Setting>

Figure 7:
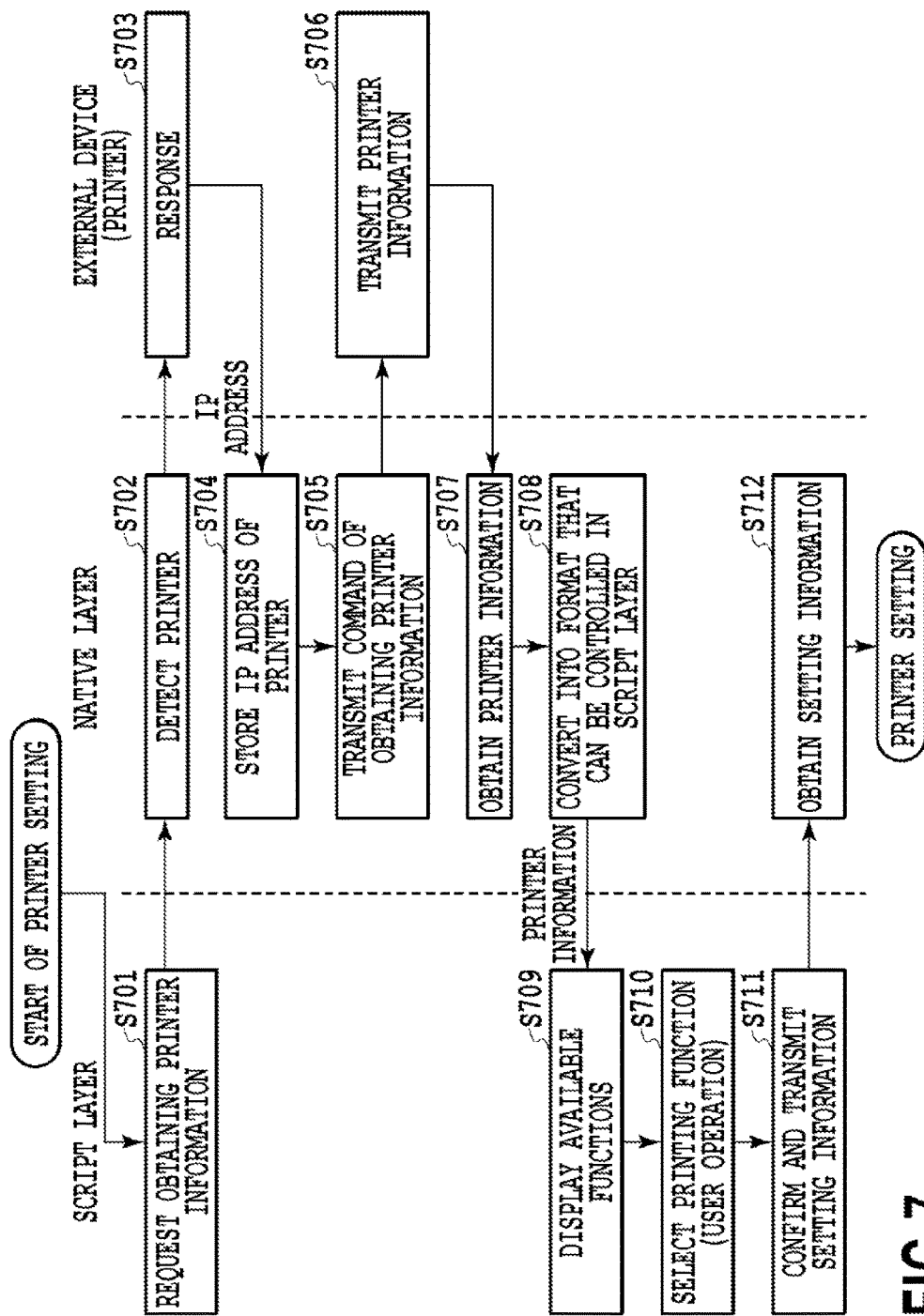
FIG. 7 is a flowchart showing the details of printer setting in Step S34 shown in FIG. 3.

FIG. 7 is a flowchart showing the details of printer setting in Step S34 shown in FIG. 3. It should be noted that Steps S701 and S709 to S711 are processing executed by the CPU 100 using programs in the script layer 217. Further, Steps S702, S704, S705, S707, S708, and S712 are processing executed by the CPU 100 using programs in the native layer 218. In addition, Steps S703 and S706 are processing executed by the printer 112.

In FIG. 7, first of all, the CPU 100 requests, in Step S701, obtaining printer information as device information from the script layer 217 to the native layer 218. This corresponds to the request from the script layer 217 for making communication with the printer 112. A manner of requesting is, as in the case of image selection, to invoke an API unique to the native from the script using a binding function. In the native layer 218, a function that can be directly invoked from the script layer 217 or a so-called wrapper, which indirectly invokes the function, is prepared in advance. For example, the native function called GetPrinterInfo is prepared and its function is invoked from the script side. As such, the native layer obtains a request, from the script layer, of communication with an external device. Normally, the script layer 217 cannot directly communicate with the external device in terms of security restrictions. For this reason, as described above, the script layer 217 once requests the native layer 218 to obtain external device information to make communication with the external device via the native layer 218. Here, the native layer 218 includes a function of communicating with the external device (e.g., the printer 112) via the OS layer 219.

Next, in Step S702, the CPU 100 executes, in a case where the native layer 218 is given the above-described invocation of the function, detection, or so-called discovery, of a printer. For example, a printer connected to the same wireless LAN router is detected. Here, for detecting a communicable printer, a manner of broadcasting, multicasting, or the like is used by using a protocol such as Bonjour (registered trademark) to attempt communication to the printer. In response to this, the printer 112 responds to the request in Step S703.

In Step S704, the CPU 100 detects and stores an IP address of the responded printer. Further, in Step S705, the CPU 100 requests providing printer information to the IP address of the responded printer. In a case where a plurality of printers have been responded, the CPU 100 requests all the printers to provide information. For this reason, the CPU 100 generates a command in the native layer to obtain printer information. The command is an instruction of designating printer operation, and as one of the examples, is expressed in the following XML.

```
01:     <?xml version="1.0" encoding="utf-8" ?>
02:     <cmd xmlns:trans="http://www.xxxx/yyyyy/">
03:         <contents>
04:             <operation>GetInformation</operation>
05:         </contents>
06:     </cmd>
```

It should be noted that the numerals such as "01:" described in the left side of each line of the above command group are only added for explanations, and are not described in the original XML format text.

The first line is a header and represents that it is described in the XML format. The cmd in the second line refers to the start of a command. The xmlns designates a name space and designates the definition of the interpretation of a command. Take note that a command with </cmd> on the sixth line shows the end of the command. The third line is declaration to describe contents thereafter, and the fifth line shows its end. The fourth line describes an instruction to be requested, and an actual instruction word exists between <operation> and </operation>. GetInformation, which is an instruction word, is an instruction of obtaining information of a printer as an external device. For example, a request is made to provide capability information such as a paper type, a size, the presence/absence of a borderless print function, print quality, and the like which are supported by the printer. It should be noted that, for the generation of a command of obtaining printer information, a fixed text stored beforehand in the ROM 101, for example, may be read. Further, the present invention is not limited to a text format such as XML, but may be described in a binary format to make communication with a protocol therealong. Further, the generated command of obtaining printer information is transmitted to the printer 112 via the external device communication unit 221 in a format in conformance with a communication protocol that is adapted to the printer such as HTTP. Further, a communication method is not limited to this. Connection may be made using Wi-Fi Direct (registered trademark), Bluetooth (registered trademark), infrared communications, telephone lines, cable LAN, and USB, and a similar advantageous result can be obtained by making communication with a protocol in accordance with such methods.

In the example shown in FIG. 7, the native layer 218 is configured to generate a command, but the same advantageous result can be obtained even with a configuration in which the script layer 217 generates a command. In such a case, the script layer 217 creates a command including an instruction sentence of the above-described XML format, for example, and delivers it to the native layer 218. Upon receiving it, the native layer 218 transmits the command to the printer 112 in a format conforming to the communication protocol.

Referring back to FIG. 7, in Step S706, the printer 112 receives the command from the information processing apparatus 115, and then transmits printer information, which is device information, to the information processing apparatus 115 in conformance with the communication protocol in the XML format. An example of printer information is shown below.

```
01:     <?xml version="1.0" encoding="utf-8" ?>
02:     <cmd xmlns:trans="http://www.xxxx/yyyyy/">
03:         <contents>
04:             <device id="Printer001" />
05:             <memory receive= 7680000 />
06:             <mode = 1>
07:                 <media>GlossyPaper</media>
08:                 <size>A4</size>
09:                 <quality>1</quality>
10:                 <border>no</border>
11:                 <dpi x=1200 y=1200 />
12:             </mode>
13:             <mode = 2>
                    -omitted-
                </mode>
                <mode = 3>
                    -omitted-
                </mode>
                -omitted-
            </contents>
        </cmd>
```

In the above information, the first line is a header and represents that it is described in the XML format. The cmd in the second line refers to the start of a command. The xmlns designates a name space and designates the definition of the interpretation of a command. Take note that a command with </cmd> on the last line shows the end of the command. The third line is a declaration to describe contents thereafter, and the contents continue until </contents> in the lower part. The fourth line shows a device ID, which represents that the model name of the printer 112 is "Printer001". The fifth line is not used in this embodiment. The details will be given in the later-described embodiment. The sixth line and subsequent lines have descriptions regarding each mode owned by the printer 112. From <mode> to </mode>, information in one mode is described. The sixth line shows 1 for a mode number. Thereafter, <media> describes a type of printing paper, <size> describes a paper size, <quality> describes print quality, and <border> describes information on bordered/borderless. The <dpi> on the 11th line represents input resolution, having 1200 [dpi] in a lateral direction and 1200 [dpi] in a horizontal direction. The details of the input resolution will be described later. The 13th line and thereafter describe information regarding mode 2, which is another mode. As such, the model name of the printer 112 and all the modes corresponding to the printer are described in this XML. It should be noted that the description method of printer information is not limited to this, and any other formats such as a text that is not a tag format and a binary format may be used.

Further, the above example relates to an example of delivering information on a print function of a printer, but the present invention is not limited to this example. This may include, for example, information on the status or the like such as image processing or analysis processing that can be processed by a printer, presence/absence of a noiseless printing mode, use/non-use of a memory card, and ink residue may be delivered. As an example of image processing, color conversion such as monochrome, sepia, and chroma highlight, layout of a plurality of images, correction of white balance, noise reduction, and other processing that automatically corrects a photo to preferable colors and brightness.

Next, in Step S707, the CPU 100 obtains printer information from the printer. The CPU 100 obtains, in the native layer, from the received printer information, a printing paper size, a type, a side(s) to be printed, color items, and the number of items, for example, in all the modes included in the printer 112. In subsequent Step S708, the CPU 100 converts the received printer information into a format that can be interpreted in the script layer 217 and transmits the resultant to the script layer 217. In other words, the CPU 100 delivers information obtained by communication with the printer 112 to the script layer 217. To be more specific, the native function is prepared to use a binding function. Further, the method of transmitting printer information of the received XML format, the method of transmitting a text format without a tag, in place of the XML format, and the like may be used. In addition, information may be obtained for every invocation of a specific native function from the script layer 217 as a return value. Also, an argument of a mode to be obtained, for example, may be delivered to the native function to obtain information as its return value. Further, delivery using the above-described JSON character strings and delivery with character strings such as BASE64 using the data conversion units 207 and 203.

Next, in Step S709, the CPU 100 forms and displays a setting screen (FIG. 10) including functions that can be used in the printer 112 based on printer information received from the native layer 218. This is also called display control. Here, in a case where there are a plurality of printers that are connectable, the names of printers are displayed, and a display screen for causing a user to select a printer for printing is generated before displaying the setting screen 1001. Then, the CPU 100 uses printer information corresponding to the selected printer and displays the setting screen on the selected printer. It should be noted that the selection of a printer is not limited to the above example, but methods of selecting a printer of the fastest response, a printer with more functions, a printer which is the least congested with fewer print jobs may also be considered.

As such, the CPU 100 displays the setting screen 1001 (FIG. 10) to cause a user to select functions that can be used in the printer such as a printing paper size, a type, a side(s) to be printed, and colors. An example of HTML descriptions is shown below as an example of a method of forming a setting screen.

```
<!DOCTYPE html>
    <head>
    <title>print setting </title>
    <script>
        <!-- paper size -->
        var PaperSizeNum = GetPaperSizeNum( );
        var p = document.getElementById("PaperList");
        var i;
        for(i=0; i<PaperSizeNum; i++){
            p.options[i]      =      new      Option(GetPaperSizeT(i),
GetPaperSizeV(i));
        }
        <!-- paper type -->
        var MediaTypeNum = GetMediaTypeNum( );
        var m = document.getElementById("MediaList");
        var j;
        for(j=0; j<MediaTypeNum; j++){
            m.options[j]      =      new      Option(GetMediaTypeT(j),
GetMediaTypeV(j));
        }
        <!-- print quality -->
        var QualityNum = GetQualityNum( );
        var q = document.getElementById("QualityList");
        var k;
        for(k=0; k< QualityNum; k++){
            q.options[k]      =      new      Option(GetQualityT(k),
GetQualityV(k));
        }
        <!-- bordered/borderless-->
        var BorderNum = GetBorderNum( );
        var b = document.getElementById("BorderList");
        var l;
        for(l=0; l<BorderNum; l++){
            b.options[l]      =      new      Option(GetBorderT(l),
GetBorderV(l));
        }
        <!-- print function-->
        function printer( ) {
            SetPrint(document.getElementById("PaperList").value,
                document.getElementById("MediaList").value,
                document.getElementById("QualityList").value,
                document.getElementById("BorderList").value);
        }
    </script>
    </head>
        <!-- display unit -->
        <body>
        paper size <select id="PaperList"></select><br />
        paper type    <select id="MediaList"></select><br />
        print quality      <select id="QualityList"></select><br
/>
        bordered/borderless          <select
```

```
            id="BorderList"></select><br />
        <br />
        <button      id="btn1"     onclick="printer( )">setting
completion</button>
        </body>
    </html>
```

The above GetPaperSizeNum( ) GetMediaTypeNum( ) GetQualityNum ( ) GetBorderNum( ) are native functions, and include functions to obtain the number of items, respectively. In a case where paper sizes adapted to a printer have four types, that is, A4, A5, B5, and L-size, for example, the GetPaperSizeNum( ) returns 4.

Also, GetPaperSizeT(n), GetMediaTypeT(n), GetQualityT(n), GetBorderT(n) are native functions, and each function returns the nth character string corresponding to the argument n. For example, the return value of GetPaperSize (0) of the function which returns a text of a paper size is "A4" and the return value of GetPaperSize(1) is "A5." These values are extracted by the native function from printer information received from the printer.

Further, GetPaperSizeV(n), GetMediaTypeV(n), GetQualityV(n), GetBorderV(n) are also native functions, and each function returns the nth character string corresponding to the argument n. For example, a return value for GetMediaTypeT(n) of a function returning the text of a paper type is a "glossy paper," which is a wording to show a user through displaying. Meanwhile, the return value of GetMediaTypeV(0) is represented as "GlossyPaper", which is interpretable by the printer.

These wordings and representations are determined by the native by associating them with information sent from the printer. For example, in a case where the value taken out from information sent from the printer is "GlossyPaper," a text to be displayed is determined as the "glossy paper." As a manner of determination, the native may hold a table of these correspondences in advance to determine a text in accordance with the correspondence table.

Incidentally, the above examples of the descriptions relate to the setting of the paper size, paper type, paper quality, and bordered/borderless, but the examples are not limited to these. As shown in FIG. 10, there may naturally be other setting items such as both-sided/one-sided, color/monochrome, and further, the on/off of image correction. Further, as described above, not only print functions but also status information such as image processing or analysis processing that can be processed by the printer, presence/absence of a noiseless printing mode, use/non-use of a memory card, and ink residue may be displayed.

In subsequent Step S710, the CPU 100 selects a function to set on the printer based on user's operation on the setting screen 1001. The displaying of HTML shown in the above example on the display 104 using the rendering unit 216 is exemplified as the setting screen 1001 shown in FIG. 10. The setting screen 1001 is formed based on the request of printer information via the native layer 218 and the obtained information using the above native function from the printer information. It should be noted that the above HTML may be formed either by the script layer 217 or the native layer 218. Further, each of setting items such as paper sizes shown in FIG. 10 is in a pull-down menu, and an item thereamong can be selected by user's operation.

In Step S711, upon detecting user's operation on the setting completion button 1002, the CPU 100 creates setting information including setting items selected through the user's operation and transmits the resultant to the native layer 218. The SetPrint( ) in the above example of the HTML descriptions is also the native function having a binding function. In the above example, SetPrint( ) is used to deliver the setting of the paper size, paper type, paper quality, and bordered/borderless to the native layer 218 as character strings.

Next, in Step S712, the CPU 100 receives setting information from the script layer 217 by the binding function. In the native layer 218, a print command is later generated in conformance with the communication protocol of the printer 112 based on the received setting information. Then, the print command is transmitted to the printer 112 via the communication control unit 213.

<Rendering and Printing>

Figure 8B:
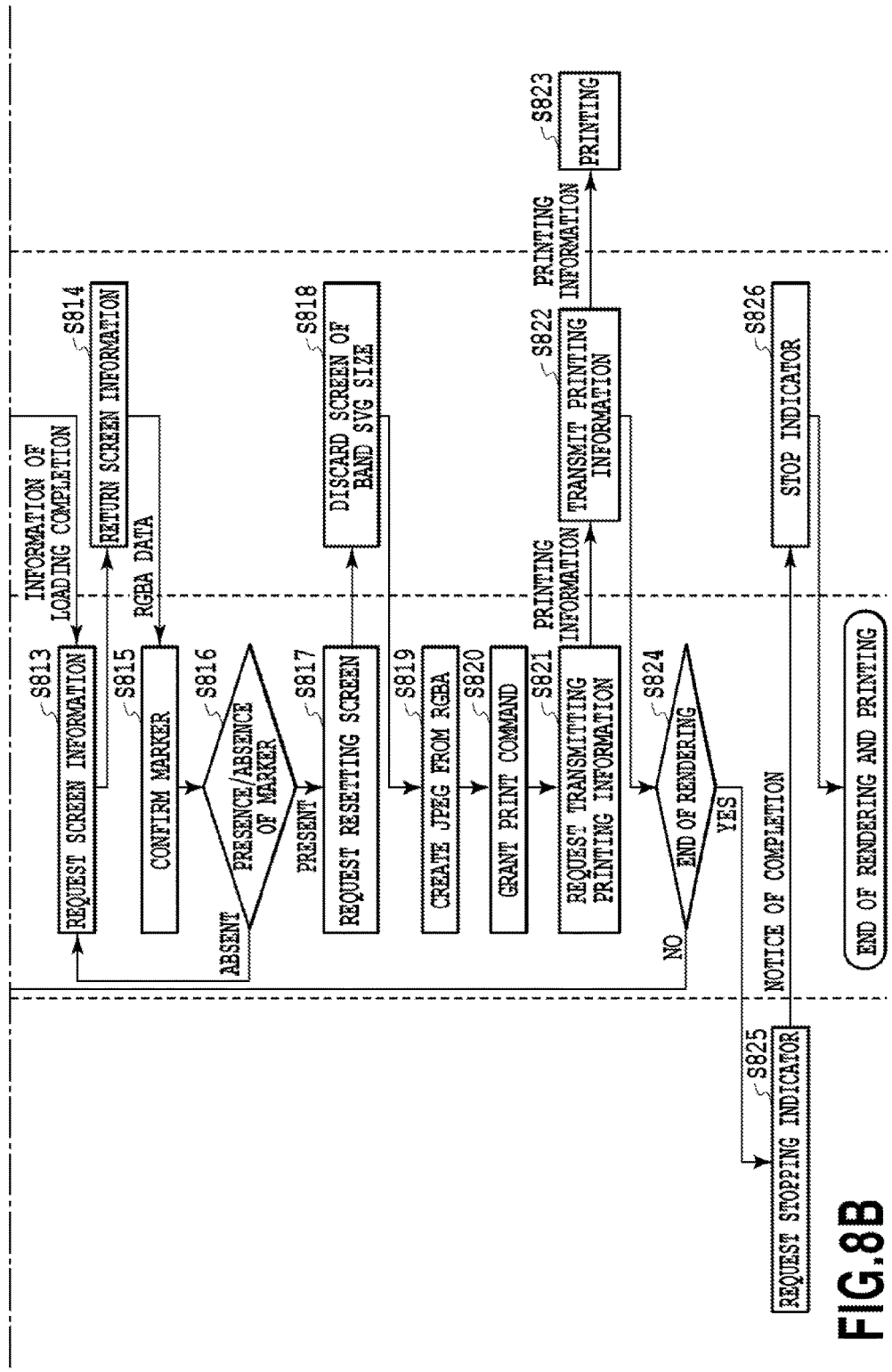
FIG. 8B is a flowchart showing the details of rendering and printing in Step S35 shown in FIG. 3.

By pressing the setting completion button 1002 in the setting screen 1001 shown in FIG. 10 by a user, rendering and printing processing starts in Step S35 in FIG. 3. FIGS. 8A and 8B are flowcharts showing the details of rendering and printing in Step S35 shown in FIG. 3. Regarding rendering and printing, their processing is described to be continued even in a case where the application therefor is transferred to the background. As a method of such descriptions, for example, a function operable even in the background such as beginBackgroundTaskWithExpirationHandler, if in the case of iOS, is used. Further, in Android, Service or the like corresponds to the function.

In FIGS. 8A and 8B, first of all, in Step S801, an indicator activation request is transmitted from the script layer 217 and, in Step S802, the OS layer 219 displays an indicator. Then, in Step S803, the script layer 217 transmits an SVG used for a UI display to the native layer 218. It should be noted that in later-described Steps S804, S805, S806, etc., processing executable in the script layer 217 may be executed in the script layer 217 instead of in the native layer. In the present embodiment, the example of an SVG having one photo and one stamp will be explained. The SVG of one photo and one stamp is described as an example as follows.

```
        <svg
            xmlns="http://www.w3.org/2000/svg"
            xmlns:xlink="http://www.w3.org/1999/xlink"
            width="640" height="480" viewBox="0 0 640 480">
            <image width="640" height="480" x="0" y="0"
                xlink:href="image data for displaying Base64"
    id="image ID"></image>
            <image width="200" height="200" x="300" height="50"
                xlink:href="designate stamp path"
                id="ID for stamp"></image>
        </svg>
```

Rendering based on the above SVG description will be explained below. Here, the above SVG is only intended to give rough explanations, and detailed descriptions of the setting is partly omitted.

In Step S804, the native layer 218 obtains output resolution to be transmitted to the printer from printing information and the SVG changes its size to that size. For example, in a case where the size of an image to be transmitted to the printer has 4000×3000 pixels, the SVG is rewritten as follows.

```
<svg
    xmlns="http://www.w3.org/2000/svg"
    xmlns:xlink="http://www.w3.org/1999/xlink"
    width="4000" height="3000" viewBox="0 0 640 480">
    <image width="640" height="480" x="0" y="0"
        xlink:href=" image data for displaying Base64"
        id="imageID"></image>
    <image width="200" height="200" x="300" height="50"
        xlink:href="designate stamp path"
        id="ID for stamp"></image>
</svg>
```

In the above descriptions, the width and height of the SVG are changed along with the size of an image to be transmitted to the printer.

Next, in Step S805, the native layer 218 changes the described content of the SVG from image data for displaying to the block image group. In Steps S407 and S506 as described above, the block image group dividing the RGB image into the upper and lower halves is created and each of them is held on the RAM in the native layer. Here, those image data are converted into a Base64 format by the data conversion unit 203, and this converted data is used to change the description of the image reading of the SVG. The SVG after the change is as follows.

```
<svg
    xmlns="http://www.w3.org/2000/svg"
    xmlns:xlink="http://www.w3.org/1999/xlink"
    width="4000" height="3000" viewBox="0 0 640 480">
    <symbol id="imageID" viewBox="0 0 640 480">
        <image width="640" height="240" x="0" y="0"
            xlink:href="upper half image of Base64" ></image>
        <image width="640" height="240" x="0" y="240"
            xlink:href="lower half image of Base64" ></image>
    </symbol>
    <use xlink:href="#imageID" x="0" y="0" width="640" height="480" />
    <image width="200" height="200" x="300" height="50"
        xlink:href="designate stamp path"
        id="ID for stamp"></image>
</svg>
```

In the above example, the description location regarding an image is redescribed in the block image group.

Next, in Step S806, a marker is given to the SVG. An explanation will be given by an example in which the marker is given of a red bar on the right end of the SVG content. According to the present embodiment, the red bar is used for the marker. However, the marker is not limited to this, and may be anything as long as given information can be distinguished.

The SVG given of the red bar is as follows.

```
<svg
    xmlns="http://www.w3.org/2000/svg"
    xmlns:xlink="http://www.w3.org/1999/xlink"
    width="4005" height="3000" viewBox="0 0 4005 3000">
    <svg width="4000" height="3000" viewBox="0 0 640 480">
        <symbol id="imageID" viewBox="0 0 640 480">
            <image width="640" height="240" x="0" y="0"
                xlink:href=" upper half image of Base64"
                ></image>
            <image width="640" height="240" x="0" y="240"
```

-continued

```
                xlink:href=" lower half image of Base64"
                ></image>
        </symbol>
        <use xlink:href="#imageID" x="0" y="0" width="640" height="480" />
        <image width="200" height="200" x="300" height="50"
            xlink:href="designate stamp path"
            id="ID for stamp"></image>
    </svg>
    <rect x="4000" y="0" width="5" height="100%" fill="red" />
</svg>
```

In the above descriptions, an SVG having 4000×3000 pixels is surrounded by a larger SVG having 4005×3000 pixels. The location of this gap is an area to mark the red bar. The use of the red bar will be described later in Step S815.

Next, in Step S807, the native layer 218 makes determination on the state of the terminal. According to the information processing apparatus of the present embodiment, in a case of entering processing such as for incoming a call or starting another application, an application in execution is transferred to the background. After the application has been transferred to the background, continuing high-load processing for a memory may possibly affect other applications. In the present embodiment, in a case where the application is in the background state, as will be described later, the burden of the memory due to the operation of the application is to be decreased. In other words, in Step S807, it is determined whether the application for rendering and printing operates in the foreground or the background as the determination of the terminal state.

In subsequent Step S808, an SVG according to the determination in the above Step S807 is created. In other words, in the native layer 218, an SVG is created by varying the size of an image area to be rendered in accordance with the application being operated either in the foreground or in the background. To be more specific, an SVG for rendering only a specific area out of the SVG content is created, and in such an event, the specific area is determined according to the above size.

First of all, in Step S807, an explanation on processing in a case of determining that a printing application is in the foreground will be given below. In the application, rendering the size of 4005×3000 pixels at once improves the speed of rendering, but the burden on the memory is quite high. In other words, one rendering completes the overhead of initialization or the like at a time upon requesting a WebView of the OS to make drawing, and thus, the speed of rendering increases. However, by rendering twice for the image area of 4005×3000 pixels, for example, thereby making two overheads for the above initialization processing or the like, the amount of memory to be used can be reduced despite the decrease in the rendering speed. In this Step S808, by creating the SVG for rendering only the specific area, the amount of memory to be used at a time is reduced. An SVG for rendering this specific area is hereinafter referred to as a band SVG. In Step S808, the native layer 218 creates, for example, a first band SVG as follows.

```
<svg
    xmlns="http://www.w3.org/2000/svg"
    xmlns:xlink="http://www.w3.org/1999/xlink"
    width="4005" height="3000" viewBox="0 0 4005 3000">
    <svg x="0" y="0">
        <svg width="4000" height="3000" viewBox="0 0 640 480">
            <symbol id="imageID" viewBox="0 0 640 480">
                <image width="640" height="240" x="0" y="0"
                    xlink:href=" upper half image of Base64" ></image>
                <image width="640" height="240" x="0" y="240"
                    xlink:href=" lower half image of Base64" ></image>
            </symbol>
            <use xlink:href="#imageID" x="0" y="0" width="640" height="480" />
            <image width="200" height="200" x="300" height="50"
                xlink:href="designate stamp path"
                    id="ID for stamp"></image>
        </svg>
        <rect x="4000" y="0" width="5" height="3000" fill="red" />
    </svg>
</svg>
```

In the above, information for operating an x-coordinate and a y-coordinate with respect to the SVG is given. By changing the values of x- and y-coordinates, the area of the SVG to be drawn can be changed. As the first band, x- and y-coordinates both take 0.

In Step S809, the native layer 218 requests the OS layer 219 to generate a screen for band sizes. In the present embodiment, for obtaining the area of 4005×1500 pixels from the first band SVG, its area information is inputted. In a case where there is enough capacity for the memory, rendering may, of course, be made by 4005×3000 pixels at a time. This area information is a parameter held within an application beforehand which is required for executing rendering. This area information changes in accordance with the terminal information in Step S807 as described above. Next, in Step S810, the OS layer 219 executes generation of a screen for a band SVG (4005×1500 pixels). Information relating to the size of the band SVG is not held by the band SVG itself but by the native layer 218. Further, a screen to be generated is prepared as an off-screen which is not visible to the user.

In Step S811, the native layer 218 requests drawing the first band on the screen generated in Step S810. Then, in Step S812, the OS layer 219 loads information of the band SVG. At a timing at which the information of the band SVG is loaded, the native layer 218 can receive a notice of loading completion. For this notice, anything provided in the OS as a standard can be used. For example, for an Objective-C language used in the iOS, a webViewDidFinishLoad function can be used. Also, for a Java language used for creating an Android application, an onPageFinished function can be used.

In Step S813, the native layer 218 requests image information to the OS layer. The image information here refers to RGBA data displayed on the screen. In other words, screen capturing is executed. Then, in Step S814, the OS layer 219 executes the screen capturing and transmits the obtained RGBA information to the native layer 218. Here, the band SVG has information of 4005×3000 pixels described therein. However, an actual area prepared by the OS layer 219 is 4005×1500 pixels. In this case, a part beyond the prepared area will not be drawn. For this reason, by preparing a screen of 4005×1500 pixels, only the upper half of the band SVG is drawn, and, as a result, only the information of the upper half can be obtained. By applying this to cause the screen of 4005×1500 pixels to read the following SVG band with a changed y-coordinate allows obtaining only the lower half of the SVG content.

```
<svg
    xmlns="http://www.w3.org/2000/svg"
    xmlns:xlink="http://www.w3.org/1999/xlink"
    width="4005" height="3000" viewBox="0 0 4005 3000">
    <svg x="0" y="-1500">
        <svg width="4000" height="3000" viewBox="0 0 640 480">
            <symbol id="imageID" viewBox="0 0 640 480">
                <image width="640" height="240" x="0" y="0"
                    xlink:href="upper half image of Base64" ></image>
                <image width="640" height="240" x="0" y="240"
                    xlink:href="lower half image of Base64" ></image>
            </symbol>
            <use xlink:href="#imageID" x="0" y="0" width="640" height="480" />
            <image width="200" height="200" x="300" height="50"
                xlink:href="designate stamp path"
                    id="ID for stamp"></image>
        </svg>
        <rect x="4000" y="0" width="5" height="3000" fill="red" />
    </svg>
</svg>
```

Figure 12A:
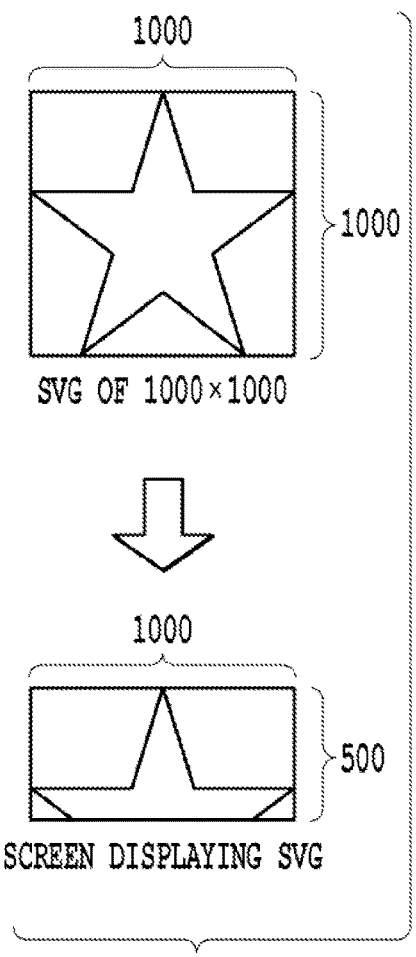
FIG. 12A is a diagram illustrating an example of loading with a screen smaller than SVG descriptions.
Figure 12B:
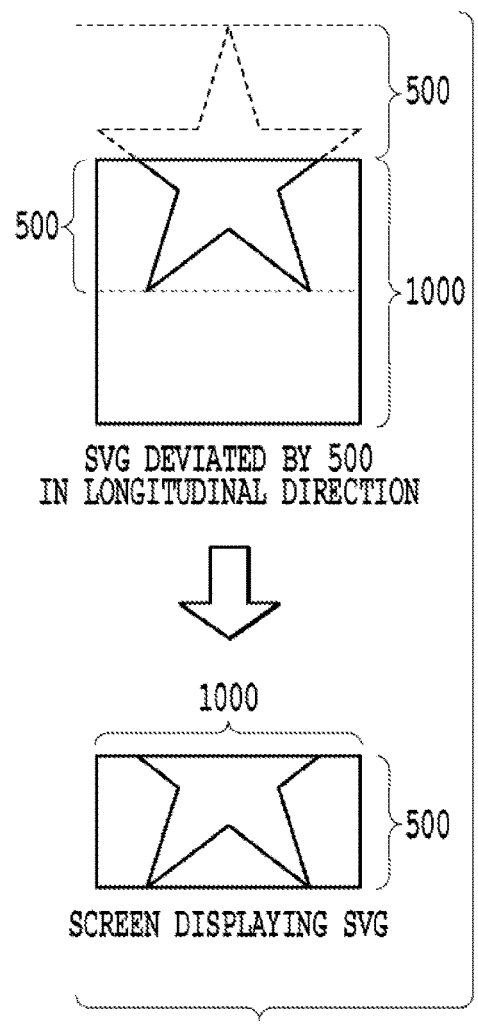
FIG. 12B is a diagram illustrating an example of deviating a y-coordinate and loading with a screen smaller than SVG descriptions.

FIGS. 12A and 12B are, as described above, diagrams illustrating an example of loading with a screen smaller than SVG descriptions and an example of deviating a y-coordinate and loading with a screen smaller than SVG descriptions, respectively.

Next, in Step S815, the native layer 218 confirms whether or not the obtained RGBA data is red in its right end. In Step S812, although information of loading completion has been transmitted, this only shows the timing of the completion of SVG data reading but does not show the completion of the SVG drawing. In other words, there is a time lug between the completion of SVG data reading and the completion of drawing, and if the screen capturing is executed during this period, an image to be sought cannot be obtained. For this reason, the red bar is given on SVG data to be loaded to determine whether the image to be sought is obtained. Then, in Step S816, the native layer 218 confirms the presence/absence of the red bar, and if the red bar cannot be confirmed, the series of processing from Step S813 are repeated. In this case, an idea of reducing the burden of the CPU by repeating processing after the lapse of a certain time period may be considered. If the red bar is confirmed, the process proceeds to Step S817.

In Step S817, the native layer 218 requests the OS layer 219 to reset a screen. Then, in Step S818, the OS layer 219 discards the screen. Discarding the screen means two things. One is to avoid erroneous recognition that drawing is completed due to a state in which the previous red bar remains upon loading the next SVG band. However, with respect to this, the colors and shapes of a marker given on every band SVG may be varied to cope with such erroneous recognition. The other is that there is a possibility of dynamically changing the sizes of the SVG band. An example of the midway change of a SVG band size will be described later.

In Step S819, the native layer 218 converts the obtained RGBA into JPEG. Here, RGBA data transmitted as a result of the processing in Step S814 includes information of the red bar which is unnecessary for printing. JPEG conversion is executed by excluding the area of the red bar. Next, in Step S820, the native layer 218 grants a print command to be transmitted to the printer to the JPEG image generated in Step S819. Here, data to be granted to the JPEG image is generated based on information of printer setting. Further, as required, a command for controlling the printer is granted. The command includes, for example, information indicating which of the nth band is the information to be transmitted and a footer indicating the final band.

In Step S821, the native layer 218 requests the OS layer 219 to transmit printing information. In Step S822, the OS layer 219 transmits printing information received from the native layer 218 to the printer 112. After completing transmission of the printing information, the process transfers to Step S824. In Step S823, the printer 112 performs printing based on the information received from the OS layer 219.

In Step S824, the native layer 218 determines whether or not the rendering is completed. The completion of the rendering may be determined by using, for example, information in which the total of the height of the obtained image is identical to the height of an output size and information in which a flag to indicate the determination of completion is ON. These are merely examples, and other determination methods may be used. In a case where rendering is not completed, processing is repeated from Step S807.

In Step S824, in a case where rendering is determined to be completed, the process proceeds to Step S825, and a request of stopping the indicator from the script layer 217 is transmitted to the OS layer 219, whereby the indicator is stopped to complete the rendering and printing processing. It should be noted that, in the example of the above explanation, out of 4005×3000 pixels, creating and printing the printing data of 4000×1500 pixels is not yet completed. In this case, the process continues to go back to Step S807 to follow the same processing thereafter.

Next, in Step S807, the procedures of a case where the application for the rendering and printing is transferred to the background will be explained. In this case, the size of screen area generated in Step S810 is made smaller than in the case of operating in the foreground. In other words, as described above, in a case where the application is in the foreground, a first band SVG obtains an image in the size of 4005×1500 pixels, whereas, in a case where the application is in the background, area information (size) of the screen generated in Step S810 is changed to 4005×16 pixels. Due to this change, a memory required for rendering processing in Step S810, which had been approximately 18 MB before the change, is changed to 192 KB, thereby reducing to about 1/94. As a result, in a case where the application is transferred to the background, the possibility in which the application is deleted from the memory by the OS can be reduced. Consequently, the same processing as described above after Step S808 is made in the size of 4005×16 pixels. In this case, the descriptions of the SVG band are as follows:

```
<svg
    xmlns="http://www.w3.org/2000/svg"
    xmlns:xlink="http://www.w3.org/1999/xlink"
    width="4005" height="3000" viewBox="0 0 4005 3000">
    <svg x="0" y="-1500">
      <svg width="4000" height="3000" viewBox="0 0 640 480">
        <symbol id="imageID" viewBox="0 0 640 480">
          <image width="640" height="240" x="0" y="0"
              xlink:href="upper half image of Base64" ></image>
          <image width="640" height="240" x="0" y="240"
              xlink:href=" lower half image of Base64" ></image>
        </symbol>
        <use xlink:href="#imageID" x="0" y="0" width="640" height="480" />
        <image width="200" height="200" x="300" height="50"
            xlink:href="designate stamp path"
            id="ID for stamp"></image>
      </svg>
      <rect x="4000" y="0" width="5" height="3000" fill="red" />
    </svg>
</svg>
```

As described above, an area in which data is to be obtained is the actual size of a screen prepared by the OS layer, and thus, information of 4005×3000 pixels should be described for the band SVG itself. However, the y-coordinate of the band SVG is required to be changed as appropriate so as not to obtain again the already obtained information. Further, any method of displaying the specific area of the SVG, including operating a viewBox attribute in the SVG, may be used.

In Step S809, the native layer 218 requests the OS layer to generate a screen of a size (4005×16 pixels) to obtain information. Then, in Steps S810 to S823, the series of processing identical to the above-described processing in the case of the foreground are made.

According to the above first embodiment, in a case where the application is determined to be transferred to the background for some reason during execution of the rendering processing and printing processing, it is possible to significantly reduce the amount of memory used by the application. As a result, the possibility in which the application is deleted from the memory by the OS can be reduced.

Furthermore, in the above embodiment, rendering is made in the unit of 16-pixel line at the time at which the application is transferred to the background. Meanwhile, there may be a case where the application in the foreground such as a call during the processing ends and the printing application returns to the foreground again. In this case, the rendering size of the 16-pixel line can be enlarged to the original size of the rendering. To be more specific, in Step S809, the native layer 218 requests the OS layer to generate the screen of a size (4005×H pixels) to obtain information. Here, H has a value larger than 16. Such a form is also included in the range of the present invention.

Second Embodiment

The second embodiment of the present invention relates to a form of storing image data that has been held on-memory by writing to a file in a case where the printing application is transferred to the background. It should be noted that the following explanations are mainly given only on aspects that are different from the above first embodiment.

The image content to be described for the SVG is held in the secondary storage device 103 with a file format such as JPEG in an image storage area originally managed by the OS. In a typical computer, an access speed from the CPU to the secondary storage device is lower than that to the RAM 102. Accordingly, image data once rasterized from the secondary storage device is held in the RAM on-memory so that a time period required for file reading upon execution of displaying and printing can be eliminated. Meanwhile, holding image data on the RAM results in increasing memory capacity of a whole system. Accordingly, in a case where the application is transferred to the background, the application is highly likely to be deleted from the memory by the OS.

Thus, in the present embodiment, in a case where the application is transferred to the foreground, the rasterized image data is held in the RAM on-memory. Meanwhile, in a case where the application is transferred to the background, image data is outputted to a file so as to rewrite the SVG content with a file name of the file.

According to the present embodiment, an explanation of a case where the application of rendering processing is operated in the foreground will be firstly given. In this case, as in the first embodiment, a rendering image having a size of 4005×1500 pixels is generated in Step S810 in FIG. 8A. According to the present embodiment, the size does not change. This image data is held in an on-memory state in the native layer. Due to this, the printing application of the present embodiment can, in a case where correction and working processing is made for an image, make such correction and working processing relatively faster. It should be noted that a large number of mobile phones recently include the camera resolutions of more than 10 million pixels. In this case, assuming that the RGB components per pixel have three bytes, a memory required to hold one image amounts to 30 M bytes. However, the recent mobile phones can reserve the memory as described above on the RAM for operation.

Meanwhile, after the above processing, in a case where the application is determined to be transferred to the background by the determination of the terminal state in Step S807 with respect to rendering of a certain band area, the following processing is added to the processing of creating the band SVG in Step S808.

First of all, in Step S808, an image which has been divided in half and which is currently held on-memory is stored under the respective names "imageID_above.bmp" and "imageID_below.bmp", as files, in a temporary area of the application. After storage, the area of the corresponding image that has been held on-memory is deleted. Due to this, it is possible to delete the memory of 30 MB, for example, for the memory (the RAM in the present embodiment) related to the on-memory.

Next, using the written file name, processing of rewriting an Image tag of the SVG content for printing is to be made. To be more specific, the descriptions will be as follows:

```
<svg
    xmlns="http://www.w3.org/2000/svg"
    xmlns:xlink="http://www.w3.org/1999/xlink"
    width="4005" height="3000" viewBox="0 0 4005 3000">
  <svg x="0" y="-1500">
    <svg width="4000" height="3000" viewBox="0 0 640 480">
      <symbol id="imageID" viewBox="0 0 640 480">
```

-continued

```
        <image width="640" height="240" x="0" y="0"
            xlink:href=" imageID_above.bmp" ></image>
        <image width="640" height="240" x="0" y="240"
            xlink:href=" imageID_below.bmp" ></image>
      </symbol>
      <use xlink:href="#imageID" x="0" y="0" width="640"
height="480" />
      <image width="200" height="200" x="300" height="50"
          xlink:href="designate stamp path"
          id="ID for stamp"></image>
    </svg>
    <rect x="4000" y="0" width="5" height="3000" fill="red"
/>
  </svg>
</svg>
```

In the above example, the described location relating to an image is redescribed in the stored file name. Also, since the area of 4005×1500 pixels has already been rendering processed, a y-element of an svg tag shows −1500. Band rendering processing is made thereafter based on the above rewritten SVG.

According to the second embodiment as described above, although a time period to rasterize a file again upon rendering is required, it is possible to reduce the amount of memory occupied by the application in the RAM. The above example shows that one image has 30 MB memory, but considering that a plurality of images are held, the amount of reducing memory according to the present embodiment is relatively large, and thus the possibility of deleting the application can further be reduced.

Incidentally, according to the present embodiment, area information relating to image generation in Step S810 remains in 4005×1500 pixels, but the application of the present invention is not limited to this. In order to further reduce the memory amount in execution, the combination of the above-described first embodiment and the present embodiment may be configured for operation.

Third Embodiment

Figure 13B:
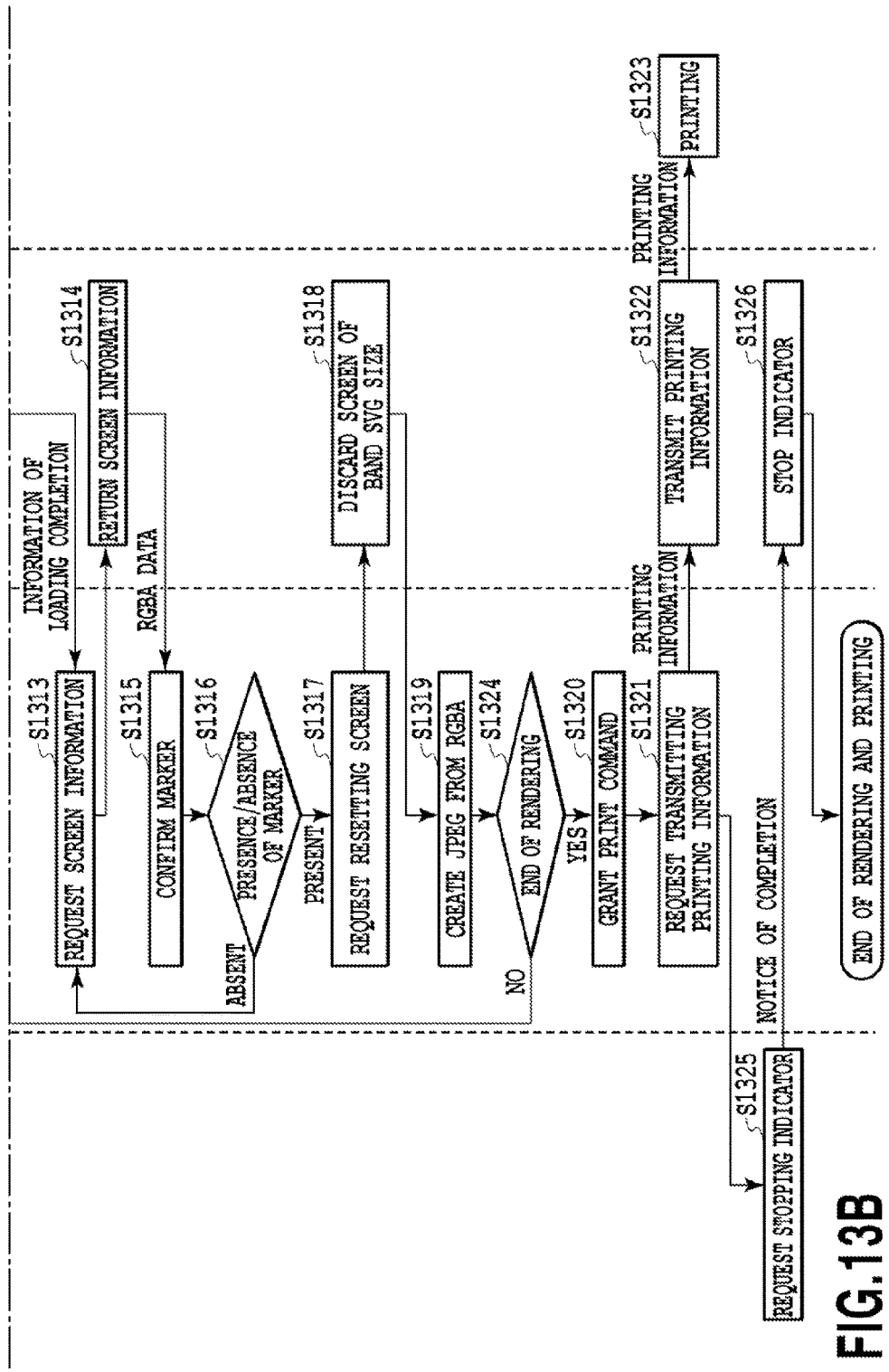
FIG. 13B is a flowchart showing the details of rendering and printing according to a third embodiment of the present invention.

The third embodiment of the present invention relates to a form of reducing the resolution of image data for rendering processing to reduce the amount of memory to be used by the application. FIGS. 13A and 13B are flowcharts showing the details of rendering and printing according to the third embodiment of the present invention. Different aspects in processing shown in FIGS. 8A and 8B will be explained below.

First of all, in Step S1307, the state of the terminal is determined. As an example, determination regarding an initial band is made in a state in which the application is operated in the foreground. As a result, in Step S1308, as in the first embodiment, an SVG file for printing 4005×3000 pixels is created to render the initial band in Steps S1309 to S1319. The image size of rendering this band is, as in the first embodiment, 4005×1500 pixels.

Next, upon executing rendering for a second band, in the determination of the terminal state in Step S1307, the application is determined to be transferred to the background. In this case, in the present embodiment, image data of 4005×1500 pixels of the initially rendered band is, first of all, once discarded. Next, in Step S1308, SVG data with resolution lowered by half is constructed. To be more specific, the descriptions will be as follows:

```
<svg
    xmlns="http://www.w3.org/2000/svg"
    xmlns:xlink="http://www.w3.org/1999/xlink"
    width="2005" height="1500" viewBox="0 0 2005 1500">
    <svg x="0" y="0">
        <svg width="2000" height="1500" viewBox="0 0 320 240">
            <symbol id="imageID" viewBox="0 0 320 240">
                <image width="320" height="120" x="0" y="0"
                    xlink:href=" imageID_above.bmp" ></image>
                <image width="320" height="120" x="0" y="120"
                    xlink:href=" imageID_below.bmp" ></image>
            </symbol>
            <use xlink:href="#imageID" x="0" y="0" width="320"
height="240" />
            <image width="100" height="100" x="150" height="25"
                xlink:href="designate stamp path"
                id="ID for stamp"></image>
        </svg>
        <rect x="2000" y="0" width="5" height="1500" fill="red"
/>
    </svg>
</svg>
```

In the above SVG descriptions, the resolution is set to be 2000×1500 pixels and changes are made to corresponding locations. Using these descriptions, the screen of the band SVG is generated in Step S1310. The size of the generated screen at this time is set to be 2000×750 pixels. As a matter of course, the marker of a five-pixel line for detecting the completion of rendering will also be required in the present embodiment.

As described above, according to the third embodiment of the present invention, in a case where the application is transferred to the background in the middle of rendering processing, the result of rendering up to that time is once discarded to make rendering in the state in which resolution is lowered. As a result, it is possible to reduce the amount of memory for generating the screen to be reserved in Step S1310. In the above example, the area of 4005×1500 pixels can be reduced to the area of 2000×750 pixels, and a memory for capturing an image can be reduced from 18 MB to 4.5 MB. Consequently, the possibility in which the application is deleted from the memory by the OS can be reduced.

Incidentally, the state of lowered resolution is held during a period in which the application is transferred to the background. Then, in a case where the printing application is detected to be transferred to the foreground, the printing resolution is set back to 4000×1500 pixels again from a subsequent print job so as to execute printing processing with higher resolution.

OTHER EMBODIMENTS

The above-described first to third embodiments relate to the form of a hybrid application, but the application of the present invention is not limited to this form. It is evident from the above explanation that the present invention can be applied even to an application developed by a language defined in each OS.

Incidentally, in the above-described rendering processing in FIGS. 8A and 8B, drawing processing is made on the printing content for an SVG by using a rendering function (black box) held by the OS in Step S812. Then, the result thereof is received by the native layer as RGBA data in Step S815. In this case, in the form of hybrid application, two image buffers, that is, an OS part and a native part, are required after rendering. Further, since the management of the image buffers held within the OS relies on the OS, a memory cannot be explicitly released from the application side, and accordingly, there is a state in which two buffers continue to be held. Therefore, the form of hybrid application tends to have larger amount of memory (buffer) to be used in the background than that of other forms of application. As such, the present invention is applied to the form of hybrid application so as to obtain a remarkable advantageous result in reducing the amount of memory to be used in the background.

Furthermore, the OS operating on the information processing apparatus 115 in the above-described first to third embodiments may apply the present invention regardless of whether the application is in multi-task operation or single-task operation. In a case where the application is in single-task operation, the application does not forcibly end immediately upon its transfer to the background due to the startup of another application. In other words, the application stops its operation due to its transfer to the background, but the application itself does not end and the state continues to be held. As a result, once the other application ends in the foreground, the application is transferred back to the foreground and restarts operation from the state in which the application has been transferred to the background. However, in this configuration, in a case where a single-task application having been transferred to the background continues to use the relatively large amount of memory for maintaining the above-described state or in a case where the state in which an application is in the background continues for a long time period, some OS processing may forcibly end the application in the background. In this case, the application of the present invention will be effective.

Further, each of the above-described embodiments relates to the form in a case where rendering processing, in particular, on the printing application operating on the information processing apparatus is transferred to the background, but the application of the present invention is not limited to this form. For example, a form of making processing in each of the above-described embodiments to reduce the amount of memory to be used may be adopted in a case where processing other than rendering by the printing application, that is, processing of color conversion, for example, is transferred to the background. Furthermore, at the time at which an application other than the printing application is operated in the information processing apparatus, a form of making processing in each of the above-described embodiments to similarly reduce the amount of memory to be used may be adopted upon the transfer of such an application to the background.

Furthermore, in each of the above-described embodiments, the mobile phone has been assumed, but the present invention is not limited to this. For example, the same configuration can be applied to a device called a tablet with a liquid crystal screen having a size of more than five inches. Further, numerical values described in each of the above embodiments are mere values set for facilitating the explanations. Even by using other numerical values, the embodiments that can obtain the advantageous result of the present invention are within the range of the present invention.

STILL OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-204253 filed Oct. 18, 2016, which is hereby incorporated by reference wherein in its entirety.

What is claimed is:

1. An information processing method for causing an OS to execute rendering processing for generating image data in response to executing a predetermined application by a processor, the method comprising the steps of:
   determining, in response to the execution of the predetermined application by the processor, whether the predetermined application is executed in a foreground or executed in a background by the OS; and
   controlling, in response to the execution of the predetermined application by the processor, to cause the OS to execute the rendering processing for a part of an image using a predetermined memory area have a memory size corresponding to a result of the determination in the determining step,
   wherein, in the controlling step,
   in a case where the predetermined application is executed in the foreground, the OS is caused to execute the rendering processing for the part of the image by using a first size memory area, and in a case where the predetermined application is executed in the background, the OS is caused to execute the rendering processing for the part of the image by using a second size memory area that is smaller than the first size memory area,
      wherein in a case where first rendering processing for the part of the image and second rendering processing for the second part of the image are executed, a first determination in the determining step is executed when the first rendering processing is executed and a second determination in the determining step is executed when the second rendering processing is executed, and
      wherein in a case where the result of the first determination is different from the result of the second determination, the memory size used for each of the first rendering processing and the second rendering processing is different from each other.

2. The information processing method according to claim 1, further comprising specifying, in response to the execution of the predetermined application by the processor, a size of the part of the image which is to be rendered by the rendering processing, based on the determination by the determining step,
   wherein
   in a case where the predetermined application is executed in the foreground, a first image size is specified in the specifying step and the OS is caused to execute the rendering processing for a part of the first image size by using the first size memory area, and in a case where the predetermined application is executed in the background, a second image size that is smaller than the first image size is specified in the specifying step and the OS is caused to execute the rendering processing for a part of the second image size by using the second size memory area.

3. The information processing method according to claim 1, wherein the controlling step comprises:
   a first requesting step, in a case where the predetermined application is executed in the foreground, for requesting the OS to reserve the first size memory area, and in a case where the predetermined application is executed in the background, for requesting the OS to reserve the second size memory area; and
   a second requesting step for requesting the OS to make the rendering processing using the first or second size memory area reserved by the request in the first requesting step.

4. The information processing method according to claim 1, wherein
   after the first rendering processing is completed, the determination is executed,
      and thereafter, the second rendering processing is executed by using a memory area of a memory size corresponding to a result of the determination.

5. The information processing method according to claim 4, wherein,
   the determination in the determining step and the rendering processing in the controlling step are executed repeatedly for each of a plurality of parts of the image, until the rendering processing is executed for a whole of the image.

6. The information processing method according to claim 1, wherein, in the controlling step,
   in a case where the predetermined application is executed in the background, the OS is caused to generate image data with low resolution compared to a case where the predetermined application is executed in the foreground.

7. The information processing method according to claim 1, wherein:
   the predetermined memory area is reserved in a predetermined memory by the OS; and
   in the controlling step,
   in a case where the predetermined application is executed in the foreground, the OS is caused to hold generated image data generated by the rendering processing in the first size memory area in the predetermined memory, and, in a case where the predetermined application is executed in the background, the OS is caused to hold generated image data generated by the rendering processing in a memory area that is different from the first size memory area in the predetermined memory.

8. The information processing method according to claim 7, wherein, in the controlling step,
in a case where the predetermined application is executed in the background, the OS is caused to hold generated image data generated by the rendering processing as a file in the memory area that is different from the predetermined memory, and is caused to hold a file name of the file in the second size memory area of the predetermined memory.

9. The information processing method according to claim 1, wherein
the predetermined application is a hybrid application.

10. The information processing method according to claim 1, further comprising,
in response to the processor executing the predetermined application, a printing control step for causing the OS to transmit generated image data generated by the rendering processing to a printer so as to cause the printer to print an image based on the image data.

11. An information processing apparatus for causing an OS to execute rendering processing for generating image data in response to executing a predetermined application by a processor, the information processing apparatus comprising:
a determining unit configured to determine, in response to the execution of the predetermined application by the processor, whether the predetermined application is executed in a foreground or executed in a background by the OS; and
a controlling unit configured to cause the OS, in response to the execution of the predetermined application by the processor, to execute the rendering processing for a part of an image using a predetermined memory area having a memory size corresponding to a result of the determination in the determining unit,
wherein, in the controlling unit,
in a case where the predetermined application is executed in the foreground, the OS is caused to execute the rendering processing for the part of the image by using a first size memory area, and in a case where the predetermined application is executed in the background, the OS is caused to execute the rendering processing for the part of the image by using a second size memory area that is smaller than the first size memory area,
wherein in a case where first rendering processing for the part of the image and second rendering processing for the second part of the image are executed, a first determination by the determining unit is executed when the first rendering processing is executed and a second determination by the determining unit is executed when the second rendering processing is executed, and
wherein in a case where the result of the first determination is different from the result of the second determination, the memory size used for each of the first rendering processing and the second rendering processing is different from each other.

12. The information processing apparatus according to claim 11, further comprising a specifying unit configured to specify, in response to the execution of the predetermined application by the processor, a size of the part of the image which is to be rendered by the rendering processing, based on the determination by the determining unit,
wherein,
in a case where the predetermined application is executed in the foreground, a first image size is specified by the specifying unit and the OS is caused to execute the rendering processing for a part of the first image size by using the first size memory area, and in a case where the predetermined application is executed in the background, a second image size that is smaller than the first image size is specified by the specifying unit and the OS is caused to execute the rendering processing for a part of the second image size by using the second size memory area.

13. The information processing apparatus according to claim 11, wherein
the controlling unit comprises:
a first requesting unit, in a case where the predetermined application is executed in the foreground, configured to request the OS to reserve the first size memory area, and in a case where the predetermined application is executed in the background, configured to request the OS to reserve the second size memory area; and
a second requesting unit configured to request the OS to make the rendering processing using the first or second size memory area reserved by the request in the first requesting unit.

14. The information processing apparatus according to claim 11, wherein
after the first rendering processing is completed, the determination is executed, and thereafter, the second rendering processing is executed by using a memory area of a memory size corresponding to a result of the determination.

15. The information processing apparatus according to claim 14, wherein,
the determination by the determining unit and the rendering processing by the controlling unit are executed repeatedly for each of a plurality of parts of the image, until the rendering processing is executed for a whole of the image.

16. The information processing apparatus according to claim 11, wherein, in the controlling unit,
in a case where the predetermined application is executed in the background, the OS is caused to generate image data with low resolution compared to a case where the predetermined application is executed in the foreground.

17. The information processing apparatus according to claim 11, wherein:
the predetermined memory area is reserved in a predetermined memory by the OS; and
in the controlling unit,
in a case where the predetermined application is executed in the foreground, the OS is caused to hold generated image data generated by the rendering processing in the first size memory area in the predetermined memory, and, in a case where the predetermined application is executed in the background, the OS is caused to hold generated image data generated by the rendering processing in a memory area that is different from the first size memory area in the predetermined memory.

18. The information processing apparatus according to claim 17, wherein, in the controlling unit,
in a case where the predetermined application is executed in the background, the OS is caused to hold generated image data generated by the rendering processing as a file in the memory area that is different from the predetermined memory, and is caused to hold a file name of the file in the second size memory area of the predetermined memory.

19. The information processing apparatus according to claim 11, wherein
the predetermined application is a hybrid application.

20. The information processing apparatus according to claim 11, further comprising,
in response to the processor executing the predetermined application, a printing control unit configured to cause the OS to transmit generated image data generated by the rendering processing to a printer so as to cause the printer to print an image based on the image data.

21. A non-transitory computer readable storage medium storing an information processing program for causing an OS on a computer to perform rendering processing for generating image data in response to executing a predetermined application by a processor, the program causing the OS to perform the steps of:
determining, in response to the execution of the predetermined application by the processor, whether the predetermined application is executed in a foreground or executed in a background by the OS; and
controlling, in response to the execution of the predetermined application by the processor, to cause the OS to execute the rendering processing for a part of an image using a predetermined memory area have a memory size corresponding to a result of the determination in the determining step, wherein, in the controlling step,
in a case where the predetermined application is executed in the foreground, the OS is caused to execute the rendering processing for the part of the image by using a first size memory area, and in a case where the predetermined application is executed in the background, the OS is caused to execute the rendering processing for the part of the image by using a second size memory area that is smaller than the first size memory area, wherein in a case where first rendering processing for the part of the image and second rendering processing for the second part of the image are executed, a first determination in the determining step is executed when the first rendering processing is executed and a second determination in the determining step is executed when the second rendering processing is executed, and wherein in a case where the result of the first determination is different from the result of the second determination, the memory size used for each of the first rendering processing and the second rendering processing is different from each other.

* * * * *